United States Patent [19]

Anders

[11] Patent Number: 4,984,756
[45] Date of Patent: Jan. 15, 1991

[54] ARRANGEMENT FOR LOADING A CARGO COMPARTMENT, IN PARTICULAR THAT OF AN AIRCRAFT, WITH PIECE GOODS

[75] Inventor: Helmner Anders, Uppakra, Sweden

[73] Assignee: Scandinavian Bellyloading Company Aktiebolag, Lund, Sweden

[21] Appl. No.: 322,477

[22] PCT Filed: May 12, 1987

[86] PCT No.: PCT/EP87/00246
§ 371 Date: Jan. 12, 1989
§ 102(e) Date: Jan. 12, 1989

[87] PCT Pub. No.: WO87/06909
PCT Pub. Date: Nov. 19, 1987

[30] Foreign Application Priority Data

May 12, 1986 [DE] Fed. Rep. of Germany ....... 3615927

[51] Int. Cl.$^5$ .............................................. B64D 9/00
[52] U.S. Cl. ............................. 244/137.1; 414/527;
414/515; 198/827; 198/831; 244/118.1
[58] Field of Search ....................... 244/137.1, 118.1;
414/527, 528, 510, 514, 515, 521; 198/750, 496,
827, 840

[56] References Cited

U.S. PATENT DOCUMENTS

| | | | |
|---|---|---|---|
| 1,251,372 | 12/1917 | Hewitt | 414/527 |
| 1,728,664 | 9/1929 | Comstock | 198/496 |
| 2,129,796 | 4/1938 | Swift | 214/83 |
| 3,043,419 | 7/1962 | Morrow | 198/827 |
| 3,047,131 | 7/1962 | Duncan | 198/827 |
| 3,481,647 | 12/1969 | Cook | 414/528 |
| 3,704,798 | 12/1972 | Carpenture | 214/38 D |
| 3,722,717 | 3/1973 | Stzyczek | 414/510 |
| 3,841,510 | 10/1974 | Walton | 214/516 |
| 3,876,089 | 4/1975 | Moser | 214/83.36 |
| 3,901,379 | 8/1975 | Bruhum | 198/831 |
| 3,998,343 | 12/1976 | Fors | 414/527 |
| 4,216,927 | 8/1980 | Byrd | 244/118.1 |
| 4,747,747 | 5/1988 | Fusco et al. | 414/528 |

FOREIGN PATENT DOCUMENTS

| | | |
|---|---|---|
| 3413528 | 10/1985 | Fed. Rep. of Germany . |
| 56-34534 | 4/1981 | Japan . |
| 63-208437 | 8/1989 | Japan . |

OTHER PUBLICATIONS

Speednews, Jun 1, 1984.

Primary Examiner—Galen Barefoot
Attorney, Agent, or Firm—Thomas R. Vigil

[57] ABSTRACT

An arrangement for loading of a cargo compartment (3), in particular that of an aircraft fuselage (1), with piece goods, is proposed, consisting of a conveying device (9) in the form of a number of high-tensile belts (10) located at intervals from one another and which are provided with a carpet-like conveying surface (18), for instance in nylon fabric, in that section of them which covers the cargo area of the cargo compartment (3) in the fully-loaded position. A rear cargo wall (23) fixed to the belts (10) provides the rear stowage room limit for the goods transported. Loading and unloading can be performed by means of movement backwards and fowards of the belts (10). Since tensile loadings are concentrated exclusively in the belts (10), reversal can be performed in the vicinity of the loading aperture (5) of the cargo compartment (3) on a thin guide section located near the floor, which can be designed to accord with any contour of the floor (14) of the cargo compartment (3). There thus results in a design for the conveying device (9) in the form of a carpet which fluidly adapts itself to any contour on which the goods transported can be safely and reliably conveyed into and out of the cargo in compartment (3).

19 Claims, 13 Drawing Sheets

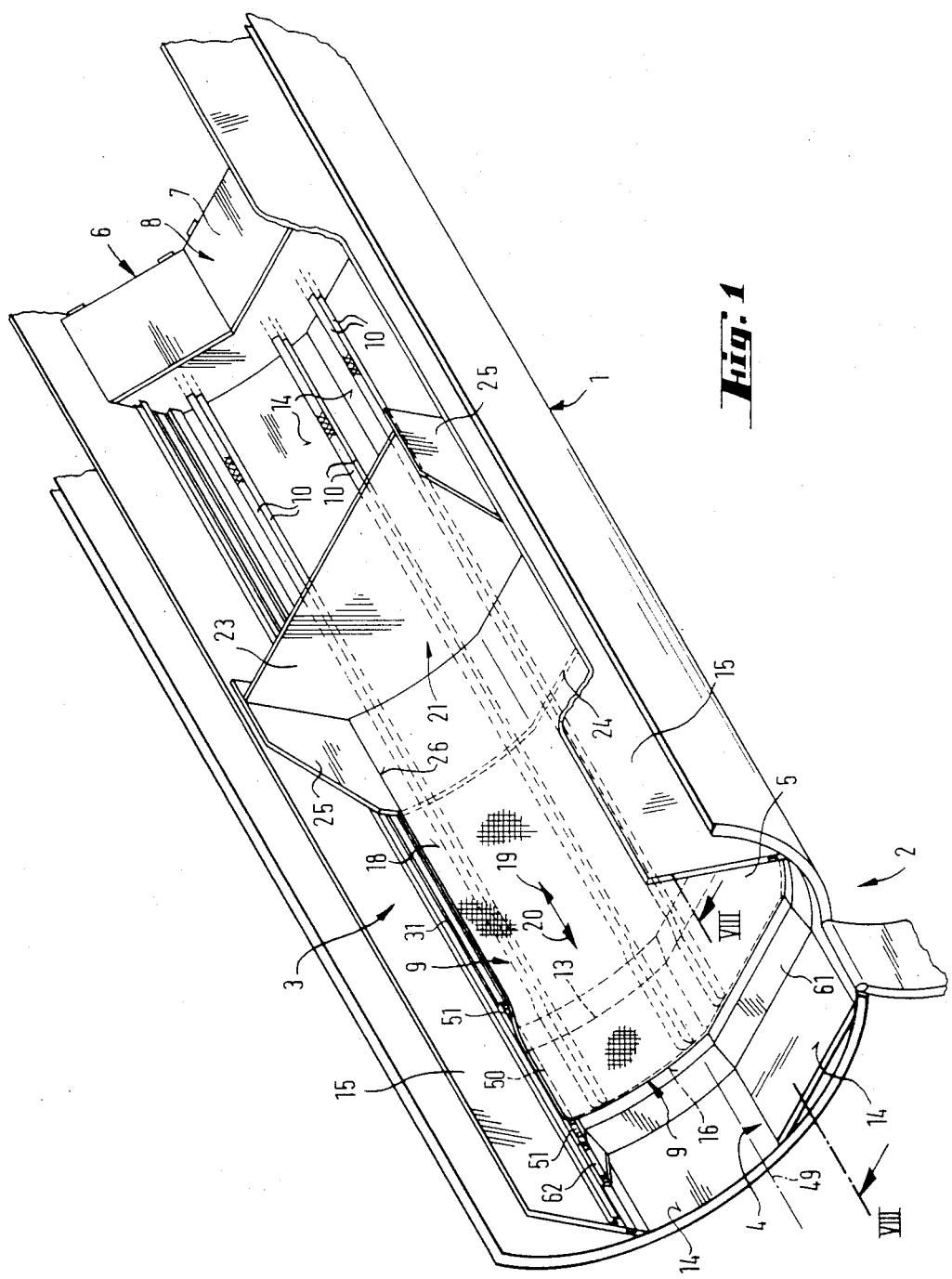

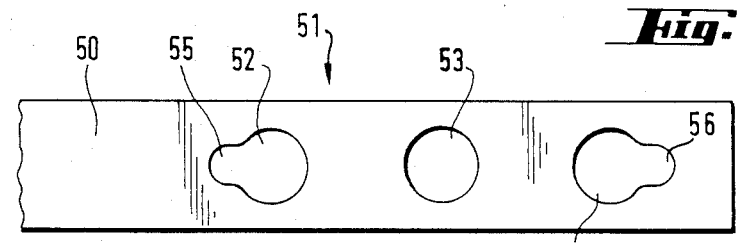
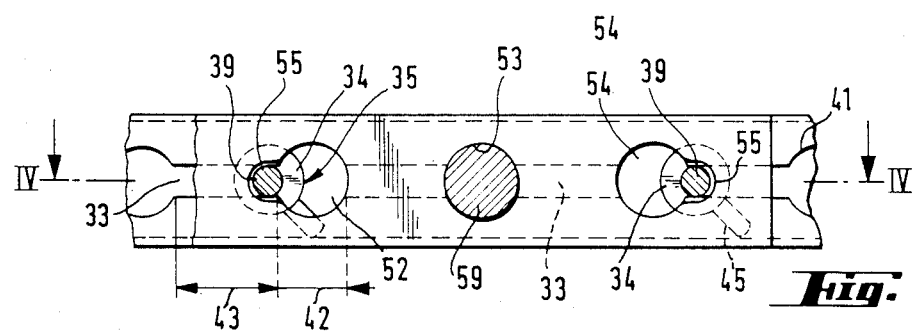
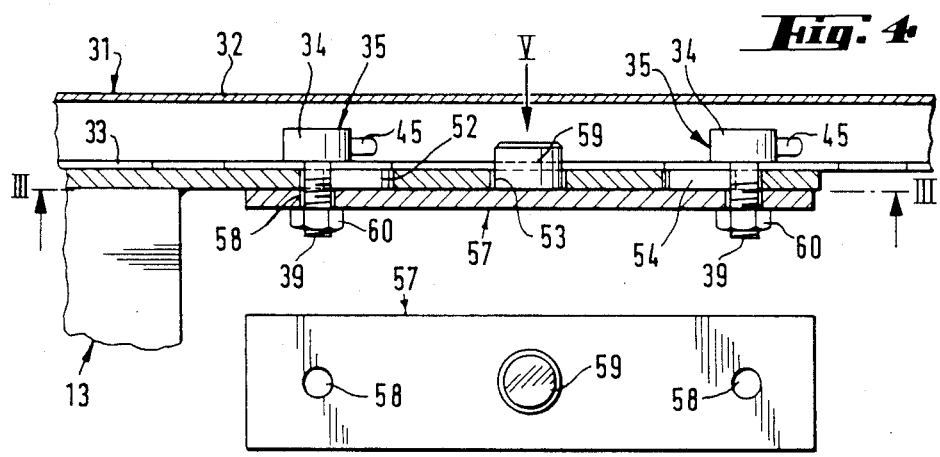

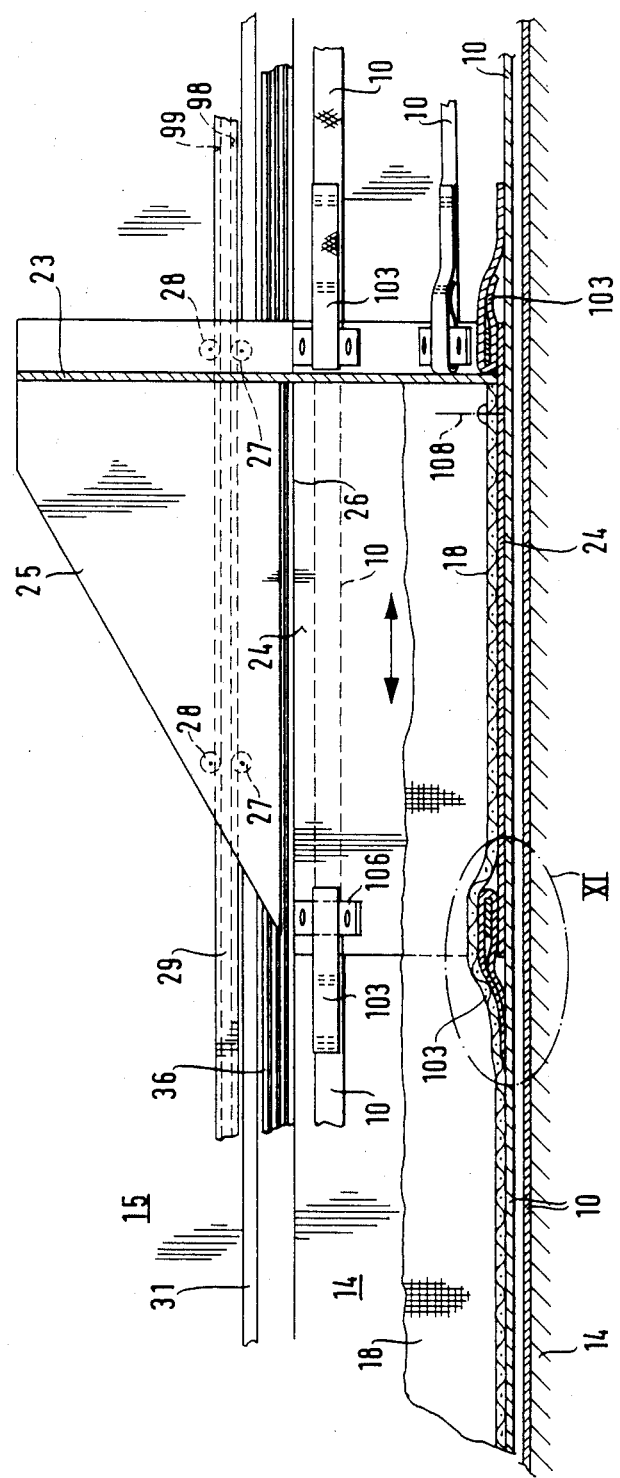

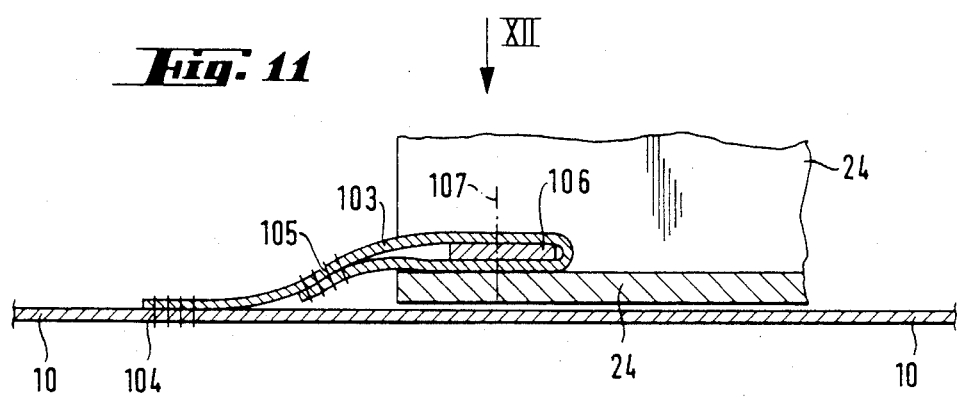
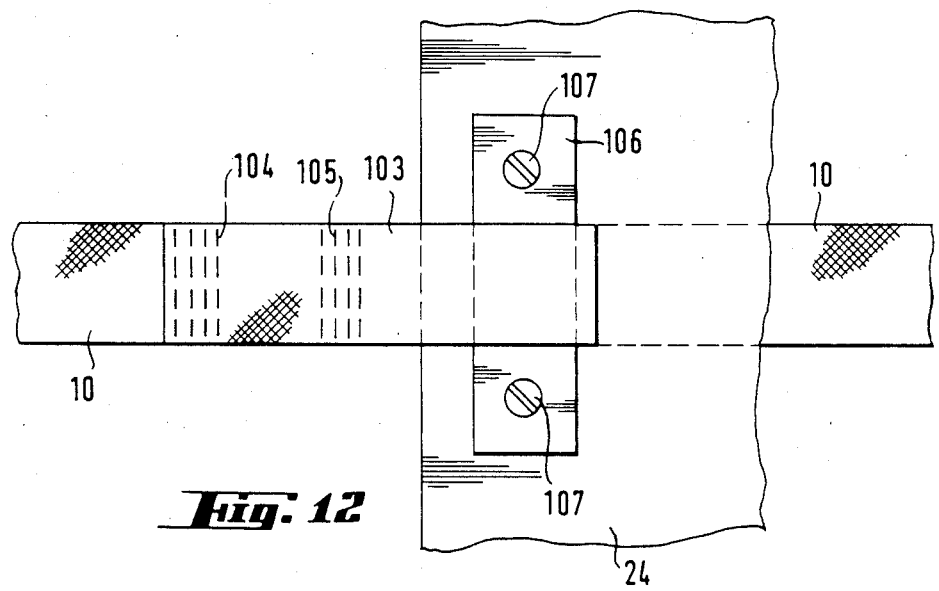

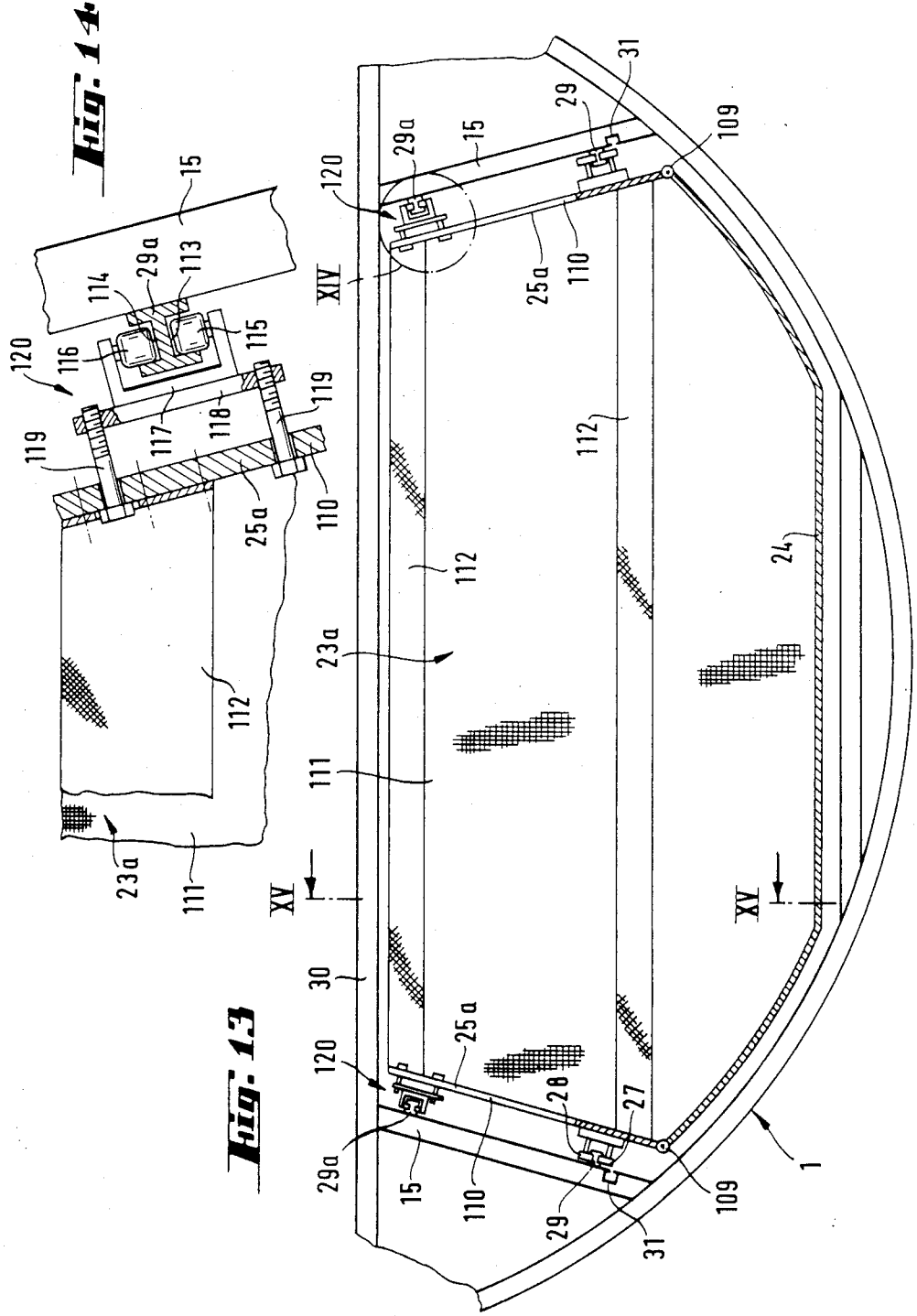

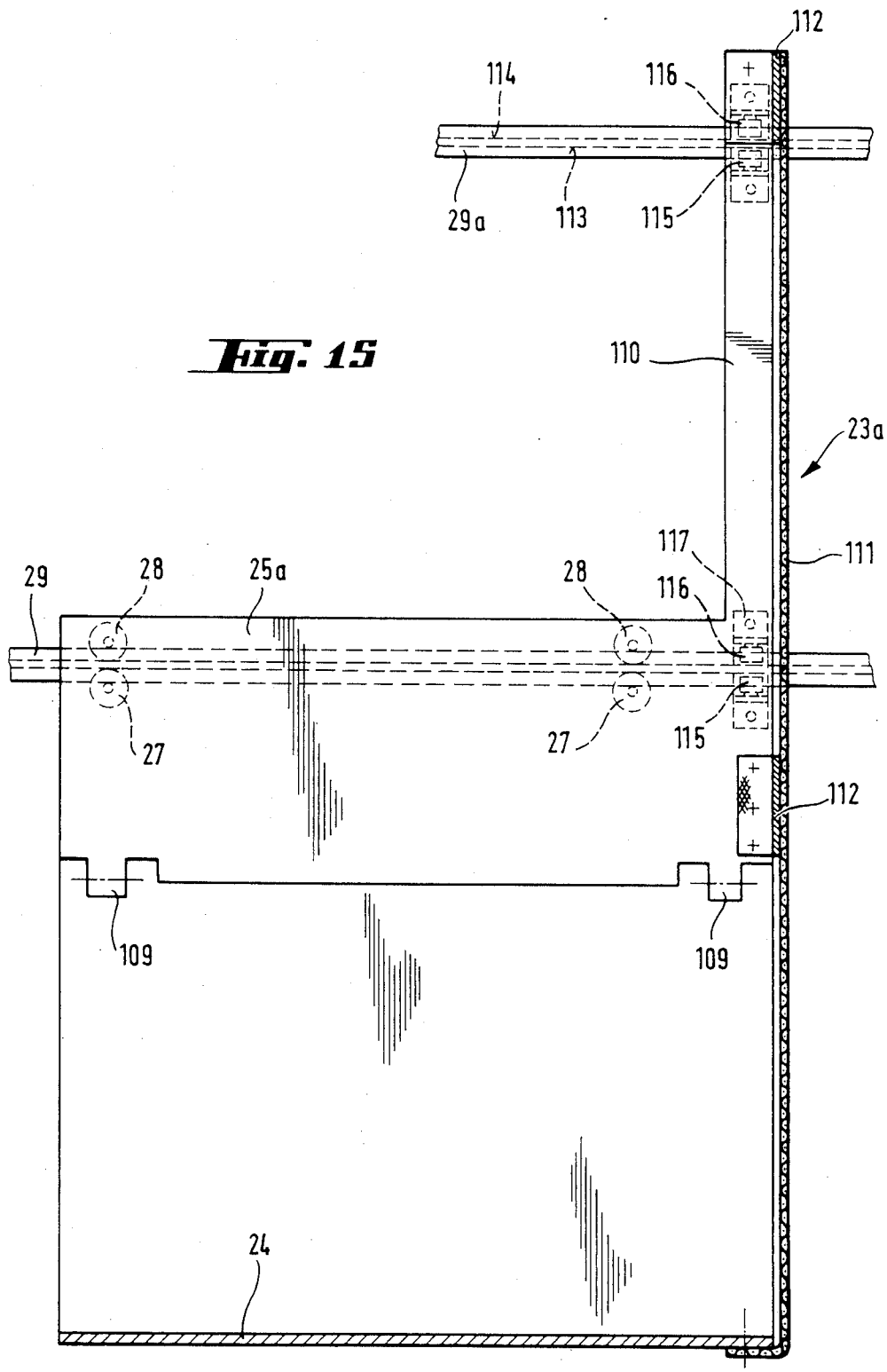

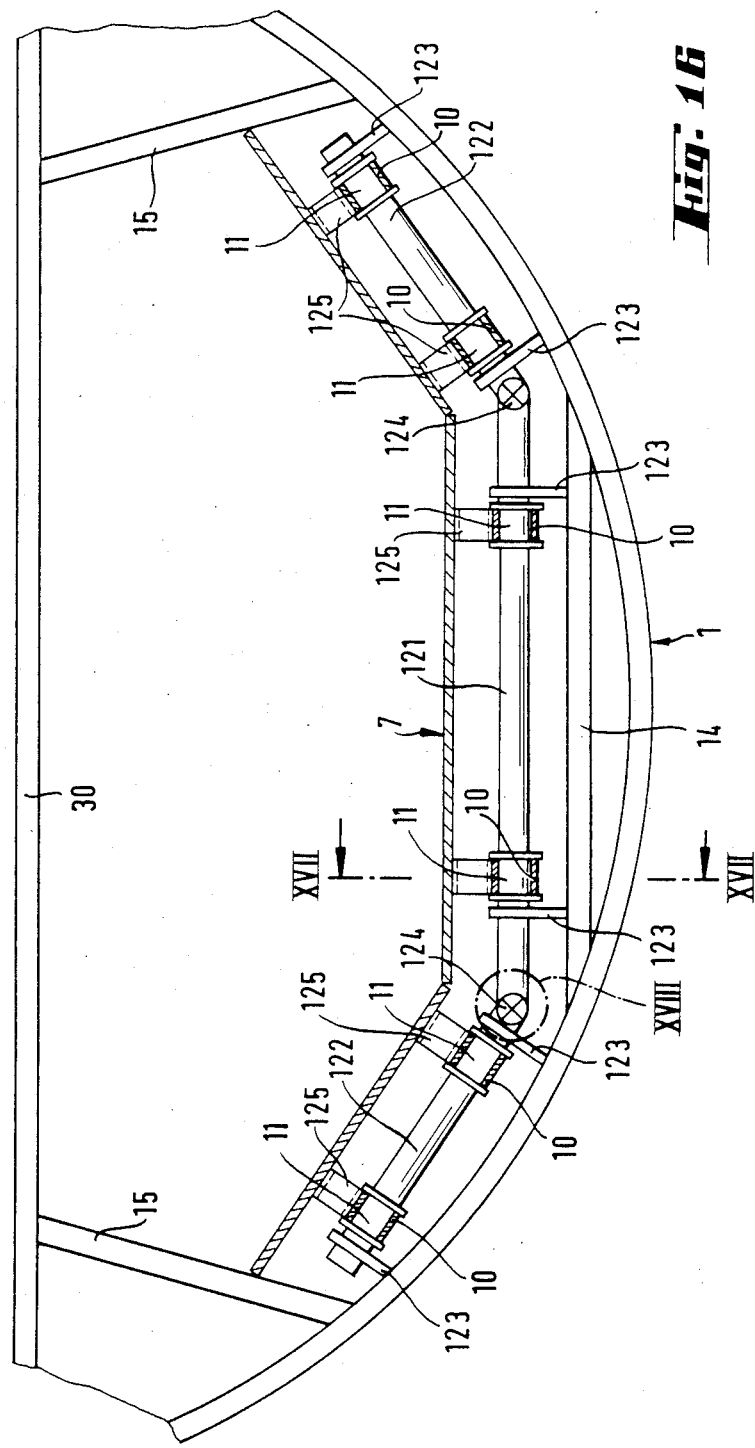

ARRANGEMENT FOR LOADING A CARGO COMPARTMENT, IN PARTICULAR THAT OF AN AIRCRAFT, WITH PIECE GOODS

The invention is concerned with an arrangement for loading a cargo compartment, in particular that of an aircraft, with piece goods.

In the case of smaller aircraft, for example, baggage holds frequently take the form of low-height, relatively elongated compartments arranged at the bottom of the fuselage. If cargo such as passenger baggage has to be stowed in such a hold, the first few items have to be taken in deep to the area of its rear wall, and loading then continues with the cargo compartment progressively being filled up from the rear to the loading aperture. This is awkward and time-consuming.

The concept of a means to facilitate the loading and unloading of such a cargo hold in an aircraft, became known from an article published in the SPEEDNEWS issue of 01 June 1984.

The handling system referred to therein consists of three separate elements which are arranged at an angle to one another in order to accommodate the curvature of the cargo compartment floor.

The first handling element, the main element, is arranged horizontally at the centre and comprises two belts of high tensile strength which can be wound up on rollers at the rear end of the hold, and a carpet-like conveying fabric which is connected to the belts at the front as seen in the direction of flight, and which can be wound up on a front roller or drum in front of the loading aperture as seen in the direction of flight. Arranged at the point of connection between the two belts and the carpet-like conveying fabric is a loading rear wall which, as the loading operation proceeds, progressively moves from a position close to the loading aperture towards the rear, with the belts being gradually wound up on their respective rollers and the carpet-like conveying fabric gradually being unwound, until the loading rear wall eventually reaches the area of the cargo compartment rear wall and the carpet-like conveying fabric extends over the entire length of the cargo compartment.

The second handling element is again a carpet-like conveying fabric similar to an endless belt, with a front and rear guide pulley (idler) or drum, whereby the rear guide pulley is located at the level of the rear winding rollers for the belts, and the front guide pulley is located at the level of the front winding drum for the central handling element, but with both pulleys inclined to the respective axes of these elements. The second handling element is arranged at the opposite side of the cargo compartment to the loading aperture.

The third handling element is likewise a carpet-like conveying fabric similar to an endless belt with a rear guide pulley at the level of the winding rollers for the belts and a front guide pulley which is located in the vicinity of the rear edge of the loading aperture as seen in the direction of flight. Thus the third handling element is shorter that the first and second handling elements and extends longitudinally such that it avoids the loading aperture. The guide pulleys for the third handling element are suitably inclined to the horizontal so that the horizontal first handling element forms a channel with the two lateral second and third handling elements, the cross section of which channel is polygonal and approximately matched to the curvature of of the floor of the aircraft's fuselage.

A drive motor for this handling facility is not indicated in this item of literature, which essentially only consists of a drawing. It is, however, assumed that the facility is power driven. Owing to design constraints, such a power unit can only reasonably engage at the loading rear wall and move this so that it, in turn, moves the central horizontal handling element such that, in the case of a loading motion, the belts are increasingly wound up on the rear winding rollers and the carpet-like conveying fabric is unwound from its winding drum, and vice versa in the case of an unloading motion. The loading rear wall also spans the conveying fabrics of the two lateral handling elements and is obviously secured to these so that such a drive also serves to move these endless type conveying fabrics of the lateral handling elements.

Although this known arrangement thus disclosed allows all the items of baggage or similar cargo to be deposited in the area of the loading aperture and, by the same token, enables the hold to be completely filled without the need for staff to enter the rear of the cargohold, and also enables the hold to be similarly unloaded, it nevertheless has a number of serious disadvantages.

The use of three separate and independently supported conveying fabrics not only rendors impairment of the cargo virtually unavoidable as a result of the gaps between the handling elements, it also means in particular considerable difficulties in providing a practical and functionally effective drive; hence also the lack of any tangible indication of a drive system in the item of literature referred to. It should be remembered in this context that the cargo is of considerable weight, and the conveying fabric carrying this high cargo weight has to be pulled along the fuselage bottom; a great deal of power would therefore be necessary to overcome the resultant floor-side friction. If this power were to be applied via the loading rear wall, this would itself have to be able to withstand the resultant high forces and thus be specially designed and guided; no design is offered which might be commensurate with such requirements. Drive elements located in the area of the loading rear wall would also obstruct the space available for cargo.

Although the heaviest load is borne by the horizontal central portion of the handling system which is formed by the horizontal conveying fabric of the first handling element, the forces acting on the endless belt-like lateral conveying fabrics as a result of the weight of the cargo are nevertheless also considerable. While the conveying fabric of the first, central handling element can slide directly on the cargo hold floor, so that acceptable gliding conditions can be created, the two strands of each endless belt-like lateral conveying fabric rub against each other as they constantly move in opposite directions to each other in both the loading and unloading modes. The frictional forces generated between these two strands of the endless textile belts are considerable, requiring increased drive power and leading to rapid wear or damage of the lateral conveying fabrics.

As a result of the angle at which the lateral conveying fabrics are inclined, lateral forces occur through the weight of the cargo being loaded or unloaded, which act towards the centre, causing the lateral conveying fabrics to tend to contract inwards. The creasing which occurs as a consequence of this combined with the poor sliding conditions gives rise to friction peaks which further substantially accelerate wear and the destruction of the lateral conveying fabrics.

However, the most significant disadvantage lies in the fact that the motive power introduced by the drive to move the handling facility has to be absorbed in some way or other by the aircraft body. This means that forces are transmitted to the aircraft frame which are difficult to monitor, leading to uncontrollable stress peaks in bearing components and thus to the danger of overload. Moreover, this hazard occurs not only during loading and unloading on the ground but also while the aircraft is in the air, particularly if the hold is only partly full and the loading rear wall is thus located in a central position in order to prevent the cargo from undergoing major inertial movements. Should the aircraft have to pull out a dive or make an emergency landing, inertial forces of 1.5 times deadweight may well develop, causing the cargo to be pushed against the loading rear wall. In order to prevent the rear wall from moving as a result, these considerable forces must be transmitted to the fuselage by the drive and its means of securement. This results in considerable loading of the fuselage frame similar to that which occurs as the loading rear wall progresses down the partly filled cargo hold with the aircraft at standstill on the ground.

In any case it is difficult and hazardous to absorb the high drive forces of the handling facility, which are exacerbated particularly by the unfavourable frictional conditions, through the fuselage frame as this constitutes a delicately balanced lightweight construction which, in spite of its extreme lightness, is already subjected to considerable loading due to the demands of flight; thus any atypical stress peaks as compared with the usual forms of loading can lead to damage occurring with far-reaching consequences. In the case of other vehicles such as ships or wheeled vehicles, the transmission of additional high stress peaks to the load-bearing structure is, although less hazardous, nevertheless extremely undesirable.

In view of the above, the object of the invention is to create a facility in which the level of drive power required is limited and the transmission of the resultant forces to the load-bearing structure of the aircraft or similar is at least reduced if not completely avoided.

According to the invention there is provided an arrangement of the drive motor for the handling facility in the area of the rear end of the cargo hold means that it does not constitute an obstruction in the useful stowage area of the hold. Moreover, it constitutes a simple design solution for the provision of a drive power transmission system, employing as it does the rollers or pulleys located in the same area, and flexible, strong traction elements such as belts. The loading rear wall itself does not need to be incorporated into the drive train. Owing to the fact that only the belt-return idlers are located in the area of the loading aperture, mounted on a guide unit between the top and bottom strands of the conveying fabric, a drive operating the rear rollers can be employed both for loading and unloading operations. As the guide unit is itself braced by a slide plate against the traction forces exerted by the drive in the rear of the cargo compartment, not only are the top and bottom portions of the conveying fabric prevented from rubbing directly against each other under load, and low-friction gliding of the conveying fabric loaded with cargo ensured, but also stressing of the load-bearing wall sections of the cargo compartment through transmission of the drive forces is, in particular, avoided; this is because the drive forces are absorbed by the front guide unit in both directions of drive operation and transmitted via the slide plate back to the drive assembly. The entire loading facility - aside from its basic positional securement to the load-bearing structure of the cargo compartment - thus operates in a largely autarkical manner, as the forces generated by the drive are re-absorbed at least in part and, if required, completely, by the loading facility rather than being transmitted to the external structure. This ensures that the load-bearing structure of the cargo compartment is spared any form of stress peaks. Because the strong, flexible traction elements, for example in the form of belts, can be distributed over the entire width of the cargo compartment floor, and rotated around the return idlers of a guide unit which can also be adapted to the shape of the cargo compartment, a single continuous conveying fabric can be provided from one side of the hold to the other, in spite of unevenness in the shape of the cargo compartment floor, with the portions of the flexible carpet-like conveying fabric arranged between the belts being protected against excessive tensile stresses through concentration of the traction load at the belts or similar traction elements. The belts or similar can be operated separately for the purpose of winding, idler return, etc., without any disruption from the textile material between the belts. The rear rollers at which the belts are wound or returned, can be of a choice of designs as they only operate the belts, without any textile material between them, owing to the fact that the conveying fabric between the belts or similar does not reach the area of the rear rollers in any operating position.

The number of belts is determined in accordance with the tensile forces to be transmitted. These can be quite considerable when, for example, handling 600 kg of cargo per running meter of cargo compartment area. Arrangement of the belts is therefore in principle one of initially uniform distribution across the width of the handling facility such that the textile material located between the belts is not excessively loaded during transportation of the piece goods located between the belts. The belts preferably consist of an inelastic textile material such as Kevlar; Kevlar is a registered trademark of the Dupont company and is used to designate aramide fibres (poly-(1.4-phenylene terephthalic amide)) of extremely high stretch-resistance, high strength and flexibility. Provision of non-elastic belts prevents any appreciable initial stretching when they are subjected to the tensile loading necessary for the transportation of cargo. This would otherwise lead to jerky acceleration of the cargo during the transition from static friction to sliding friction between the conveying fabric and the slide plate. Instead, the lack of belt elasticity ensures that any drive motion is converted virtually immediately into a corresponding movement of the conveying fabric and the cargo it is carrying.

The front and rear ends of the belts can each be wound on their own rollers so that each belt end can be removed from its respective roller without difficulty for disassembly and reassembly of the handling facility. However, with belts which are virtually inelastic under the operational loads in question, an arrangement involving one winding and one unwinding roller for each belt gives rise to the problem that if the rollers operate at the same rotational speed, their constantly changing wound diameters will cause different lengths of belt to be paid out and rolled up. This could result in slack portions of belt developing in front of the conveying fabric as seen in the direction of traction, possibly leading to disruption and the need for costly compensation measures.

Already disclosed in US-A-3,876,089 referring to a handling facility for a vehicle, is the concept of returning the traction elements of a conveyor in the area of the unloading aperture and providing at the opposite end the drive for the conveyor pulleys located there. The facility in question is an unloading system for a truck trailer for bulk materials, the conveyor of which takes the form of a travelling floor with butting or fish-scalelike, overlapping rigid floor plates. This travelling floor discharges the bulk material over the rear conveyor return point.

Further according to the invention, the belts are preferably of the endless type, at least in functional terms, which revolve around pulleys at the opposite end of the cargo compartment to the loading aperture. With such an arrangement there are no problems with varying belt lengths as a result of the constantly changing differential between the working diameters of the winding and the unwinding rollers. Compensatory measures are thus not necessary, and it is sufficient to incorporate, if required, a spring element such as a spring-action roller with a short spring excursion in order to maintain a desired minimum degree of tension. In this case it must, however, be ensured that the drive to the belts on the pulleys is imparted with a minimum degree of slip, and preferably with no slip at all. Thus the pulley and the belt should be provided with positive driving means. For example, the pulley may be designed as a pin feed drum with projections which engage in matching drive recesses in the belt; or the belt may be of toothed design, at least in the portion coming into contact with the pulley, with the pulley taking the form of a toothed drum in accordance with already familiar engineering practice. Obviously the traction element need not be designed as a belt in the narrowest of senses but may also take the form of, for example, a chain-like element. This should, however, be of plastics material in order to minimize its weight.

It is particularly preferable, to arrange a loading rear wall on the belts in the area of the rear end of the conveying fabric. This loading rear wall is then moved back and forth with the conveying fabric. This provides the utilized stowage area with a defined termination and items of baggage or similar piece goods located at the rear of the cargo compartment can be effectively supported by such a rear loading wall. During unloading operations the loading rear wall ensures reliable withdrawal of all the items of cargo being handled. The loading rear wall is not however necessary for drive purposes.

A costly support structure for the upright loading rear wall, which would cause additional forces to be imparted to the belts, can be avoided by securing the loading rear wall against tilting by means of lateral extension elements such as arms or walls with support rollers. These support rollers are arranged at intervals in the longitudinal direction of the cargo compartment and run in tracks in the side walls of the cargo compartment. Such support may also be provided or supplemented by means of a floor-based anti-tilt support system. With such systems the belts would need only to impart motion to the rear wall since the tracks on the side walls of the cargo compartment and/or the floor-based anti-tilt support system would directly ensure that it is kept in a vertical position.

Half-way through the loading or unloading operation, the front portion and rear portion of the conveying fabric positioned behind the guide unit as seen in the loading direction, reach a point where they mutually overlap as two strands of equal length. In order to avoid relative movement between these two strands of the textile material, possibly under conditions of high contact pressure, and to produce instead favourable sliding properties, provision is made for the slide plate joined to the rear edge of the guide unit to extend at least approximately half-way down the length of the cargo compartment, i.e. to that region in which the two strands of the conveying fabric could come into contact with each other. A suitable material for the slide plate would be sheet metal or similar, although due to the need for weight minimization and optimization of sliding properties, preference is given to a slide plate surface of non-sticking synthetic material such as carbon-tetrafluoride (Teflon). The slide plate may thus consist of a material resistant to compression such as carbon fibres, covered with a Teflon surface. The rear end of the slide plate is braced either directly or via suitable pressure-resistant supports against the drive unit.

For the transmission of compression forces between the guide unit and the drive, the slide plate preferably directly supports the guide unit at the end opposite to the conveyor return edge. This eliminates the need for additional pressure elements between the rear edge of the guide unit and the front edge of the slide plate, and the slide plate can essentially be integrally connected to the guide unit or the two elements can be incorporated within a single component.

To achieve the support function, the slide plate may extend along the entire length of the cargo compartment and be supported, for example, at the rear gearbox without any need for a lateral slide plate securement. Also it is particularly preferable to secure the slide plate to the structural members on the side walls of the cargo compartment so that it can then perform its supporting function even when it does not extend along the entire length of the cargo compartment or is not otherwise braced at its rear end. With such an arrangement for securing the slide plate there is the particular advantage, especially when the slide plate extends along the entire length of the cargo compartment, that the slide plate can be suspended over the floor support structure of the cargo compartment thereby forming in effect the floor of the cargo compartment. This means that the flooring provided by the manufacturer in the area of the cargo compartment becomes superfluous to needs and can be eliminated and replaced by the slide plate to save weight. Only the aircraft support structure for the conventional floor of the cargo compartment remains, at least in part, to serve as a means of support for the slide plate should this, as a result of loading, particularly centrifugal loading during flight, undergo a degree of sag and need to be braced against further such sagging.

If desired the lateral securement of the slide plate can be provided to particular advantage by springs, the strength of which is selected such that, under maximum nominal loading of the conveying fabric, the slide plate remains suspended above the floor support structure of the cargo compartment. This ensures that during loading and unloading operations, the conveying fabric is allowed to run unhindered along the underside of the slide plate, while under extreme loading in flight it is primarily these springs which deform, rather than the slide plate, to allow the latter to come into contact with, and be supported by, the floor support structure. For this purpose, longitudinal support members are preferably provided in the central area of the floor forming defined supports for the slide plate should this sink to an excessive degree, and effectively supporting the slide plate without introducing undesirable forces.

Particularly when the slide plate thus takes over the function of the cargo compartment flooring, the slide plate should preferably be of a lightweight composite material in the form of a flexurally rigid honeycomb or sandwich construction. Its securement to the structural members may be along the same lines as the securement of the guide unit.

In the case of a slide plate which runs the entire length of the cargo compartment, a mechanical retaining construction for the lateral edges of the conveying fabric should preferably be arranged on the top of the slide plate and secured via the slide plate to the aircraft structural members. If required, a similar retaining construction can also be provided on the bottom of the slide plate, although substantial forces causing a lateral contraction of the conveying fabric only occur on the top of the conveying fabric. The mechanical retaining construction should preferably take the form of a retaining track with an engaging rim which locks around projecting retainers, preferably with a certain amount of clearance, which are arranged on the top of the conveying fabric. Such retainers may take the form, for example, of plastic buttons or similar secured to the top edge area of the conveying fabric, which, when not under load, move freely in the longitudinal direction within the clearance provided for in the retaining track, but which are prevented from any appreciable inward movement by coming into contact with the engaging rim should the edge of the conveying fabric exhibit a tendency towards lateral contraction. This ensures that friction is minimized under normal operating conditions while at the same time providing a secure means of retaining the lateral edges of the conveying fabric. Where the guide unit, which cannot be provided with any permanent, rigid support from the floor of the cargo compartment between its lateral securing points, is of a curved design, and particularly if it is of a flat design, there is an unavoidable degree of flexion under conditions of pressure loading from above due to the arrangement of the cargo items. In order to prevent such flexion from causing the bottom strand of the conveying fabric to become pinched between the guide unit and the flooring, thus rendering necessary additional power to move the conveying fabric, a rolling support can be provided between the guide unit and the floor of the cargo compartment or the portion of the conveying fabric which passes under the guide unit. Suitable rollers may be provided at the bottom of the guide unit or on the tope of the cargo compartment floor, or both, in order to minimize the clamping forces applied to the conveying fabric under conditions of heavy loading. Moreover, the sliding ability of the conveying fabric under pressure loading on the top of the guide unit can be improved by supporting the belts on the top of the guide unit by means of such rollers. It is essential that all the support rollers be arranged in those zones across the width of the guide unit in which the belts run, in order to avoid additional tensile forces being introduced into the textile material between the belts. The rollers in each case do not necessarily need to absorb constant support forces, and may instead assume their support position once the guide unit has undergone a certain degree of admissible flexion.

Such floor-side support rollers should in any case be arranged close to, i.e. a relatively short distance behind the return edge, as here, in addition to the flexion caused by the weight of the cargo, a maximum degree of flexion towards the floor of the cargo compartment occurs as a result of torsional forces, which are particularly high at the beginning of the unloading operation, owing to the fact that the tensile forces needed to move the entire cargo are applied initially to the return edge. This results in an effect similar to that encountered in self-tightening compression locks in which increasing tension results in a corresponding increase in the squeeze or clamping load. Thus it should be ensured through the provision of support rollers, preferably in the front section of the guide unit, that the conveying fabric does not become clamped to the floor, even under conditions of excessive pressure loading.

The concentration of the applied tensile forces at the belts also means that support rollers only need to be provided in the area of the belts close to the return edge of the guide unit in order to provide the rolling support necessary for the belt return function. This drastically reduces the friction of the material passing under pressure around the return edge of the guide unit. In the zones between the belts, the textile material lies more or less loosely on the rounded surface of the return edge owing to the concentration of the traction forces in the area of the belts, so that no substantial frictional forces are created.

The danger of contamination of the cargo compartment underneath the conveying fabric, and also the ingress of foreign matter, are avoided by a sealing device arranged at the return edge of the guide unit which remains in contact with the conveying fabric, such that this edge zone is protected against the entrainment of dirt and similar. The sealing device preferably takes the form of a brush arrangement, producing a corresponding self-cleaning effect as the conveying fabric passes by. The provision of a dirt-catching tray below the brush arrangement enables the dirt thus collected to be periodically removed.

The drive-side belt pulleys are, in the case of cargo compartment floors of a dished design with corresponding curvature of the conveying fabric, mounted on adjacent shafts which are inclined to one another and which may, for example, be interconnected by means of universal joints. This arrangement constitutes the most suitable means of providing an effective drive pulley system.

Further details, features and advantages of the invention derive from the following description of various example embodiments which are explained with reference to the drawing.

BRIEF DESCRIPTION OF THE DRAWINGS

FIG. 1 is a perspective view of the interior of the lower section of an aircraft fuselage featuring an arrangement in accordance with the invention.

FIG. 2 is a side plan view of a retaining rail for the guide section.

FIG. 3 is a sectional view taken along Line III—III in FIG. 4 and shows the retaining rail as shown in FIG. 2.

FIG. 4 is a sectional view taken along Line IV—IV in FIG. 3.

FIG. 5 is a plan view of only the retaining plate and is taken from the direction of Arrow V in FIG. 4.

FIG. 10 is a sectional view taken along an extension of the Line VIII—VIII in FIG. 1, through the rear cargo wall area.

FIG. 11 is an enlarged detailed view from the Circle XI in FIG. 10, enlarged, but without conveying surface.

FIG. 12 is a plan view taken from the direction of Arrow XII in FIG. 11.

FIG. 13 is a schematically simplified sectional view through the bottom of the aircraft fuselage at the level of a rear cargo wall of the conveying device.

FIG. 14 is a detailed view from the Circle XIV in FIG. 13.

FIG. 15 is a sectional view taken along Line XV—XV in FIG. 13, enlarged.

FIG. 16 is a sectional view in accordance with FIG. 13, but through the area of the rear end of the cargo compartment, to illustrate the drive system.

DESCRIPTION OF THE PREFERRED EMBODIMENTS

Figure 6:
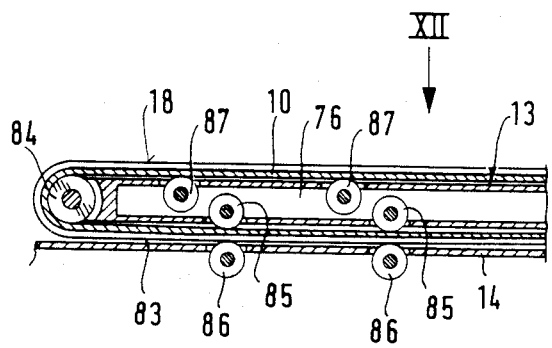
FIG. 6 is a sectional view taken along Line VI—VI in FIG. 7 and/or FIG. 13, enlarged as compared to FIG. 7.

The drawing shows an aircraft fuselage marked with a "1", of which only the lower section is visible in FIG. 1, and which has a lower loading hatch 2 at the side, through which the cargo compartment, marked as a whole with "3", is accessible.

The cargo compartment 3, which in the present example would be the cargo compartment for accommodation of passengers' baggage on a smaller passenger aircraft, has a loading aperture 5 next to the working area 4 in the vicinity of the loading hatch 2, such loading aperture being formed by the free cross-section of the cargo compartment 3 at the working area 4 and an end 6 opposite to the loading aperture 5, which is bounded in a manner not shown in more detail by a bulkhead, in the area of which a drive 8 is installed in a housing 7. The drive 8 serves for generation of motion to and fro of a conveying device 9 which serves the purpose of moving piece goods fed in the area of the loading aperture 5 away from the loading aperture 5 in steps intermittantly towards the opposed end 6 of the cargo compartment 3, in order thus to permit complete loading of the low and deep cargo compartment 3 from the working area 4 without it being necessary for the loading staff to leave the working area 4.

Figure 17:
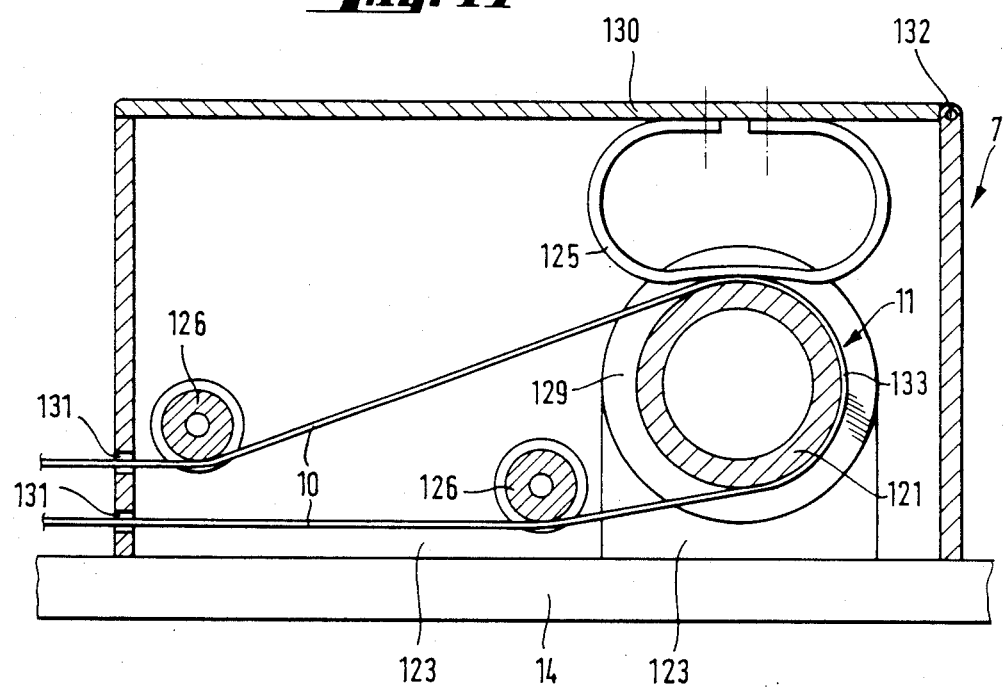
FIG. 17 is a sectional view taken along Line XVI—XVI in FIG. 16, enlarged.

As can clearly be seen from joint inspection of FIGS. 1 as well as 6 and 7, the conveying device has high-tensile belts 10, which are wound around rollers 11 in the vicinity of the drive 8; these rollers are shown in more detail in FIGS. 16 and 17. The belts 10 are reversed in the vicinity of the loading aperture 5 on a thin guide section 13 which is located at only a very low height, in the present example 30 mm, and is mounted slightly above the floor 14 of the cargo compartment 3. The guide section 13 fixed in a manner described in more detail below in the vicinity of side walls 15 of the cargo compartment 3 assures, with its front reversing edge 16, soft reversing of the belts 10 in the narrow space and thus define the distance between reversal of the belts 10 and the drive 8. In this manner, the belts 10 can, by means of appropriate drive of the rollers 11, be moved to and fro over the reversing edge 16 of the guide section 13 in order that a corresponding conveying movement into or out of the cargo compartment 3 is produced.

In order to ensure actual conveyance of goods loaded, such as items of baggage, during this conveying movement, the intermedial space between the belts 10 is bridged by a carpet-like conveying surface 18 in flexible textile material in the area in which the goods loaded may be located.

For the purpose of better illustration, this carpet-like conveying surface 18 is shown in some cases in other views as being located relatively thick on the belts 10, but it should be noted that the conveying surface 18 can in fact consist of a single-layer nylon fabric sewn in the covering area to the belts 10 and thus scarcely accumulating any thickness.

FIG. 1 shows an intermediate position during the loading or unloading sequence, with the arrow 19 indicating the direction of loading and the arrow 20 the direction of unloading. The front end 21 of the conveying surface 18 seen in the direction of loading 19 is located in a medial area between the guide section 13 and the drive 8 on the upper side of the conveying device 9, while the rear end of the conveying surface 18 in the direction indicated by the arrow 19 is located on the underside of the conveying device 9 and will approach the guide section 13 from below when further movement is applied to the conveying device in the direction of loading according to the arrow 19. In the full load condition, the rear end of the conveying surface 18 can be located in the area of the reversing edge 16 of the guide section 13, while the end 21 will come to a halt shortly before the housing 7 of the drive 8, with the result that the conveying surface 18 covers the entire effective depth of the cargo compartment 3. In the completely unloaded position, however, the end 21 is located within range of the working area 4 behind the loading aperture 5 and the rear end is located a short distance from the housing 7 of the drive 8. This ensures that the drive 8 only rolls the belts 10 under all circumstances and must never attempt to roll the area of the conveying surface 18.

A rear cargo wall 23 is provided in the vicinity of the end 21 of the conveying surface 18 and delineates the utilized cargo area on the conveying surface 18 at the side opposite to the loading aperture 5. Goods to be transported can thus be stacked against the rear cargo wall 23 without a danger arising of them falling off of the conveying surface 18 towards the drive 8. The rear cargo wall 23 is, as described in more detail below using FIGS. 10 to 12, directly mounted on the belts 10 and is thus moved backwards and forwards with the belts 10. Connected to the rear cargo wall 23 is a floor wall 24, which is mounted on the belts 10 and lateral extensions 25, which take the form of lateral webs. If, as in the present example, the conveying surface 18 is drawn over the floor wall 24 up to the vertical rear cargo wall 23, it can pass via lateral slots 26 between the floor wall 24 and the web-type extensions 25 in order to be retained in a manner described in more detail below in the vicinity of the side walls 15 of the cargo compartment 3, or alternatively a separate mounting for the edges of the conveying surface 18 at this point on the floor wall 24 or on the web-type elements 25 can be provided.

The arrangement of conveying device 9 discussed above with regard to its principle manner of function and principle structure ensures that only a minimum of effective capacity of the cargo compartment 3 is sacrificed to conveying equipment, and that nevertheless the goods for transportation are fed from the working area 4 in the vicinity of the loading aperture 5 onto the conveying device 9 and are transported into the cargo compartment 3 in stages of any required length; step-by-step forward motion of the conveying device 9 can also be applied during unloading, in order to place the items to be unloaded in an optimum position in each case in the reach of the loading and unloading staff. Due to the fact that only the belts 10 need to be handled in the vicinity of the drive 8, even an arched configuration of the floor 14 of the cargo compartment 3 and thus also of the conveying device 9 does not cause difficulties, and the reversing of tensioned belts 10 at the reversing edge 16 of the guide section 13 permits an arched shape for the guide section 13 without difficulties, as can be seen in FIG. 1, without the conveying surface 18 bridging the belts 10 without intrinsic tension producing any difficulties.

Nonetheless, the local circumstances, in particular in the cargo compartment 3 of an aircraft, produce a series of problems, particularly in conjunction with the question of support of the guide section 13, guidance of the longitudinal edges of the carpet-like conveying surface 18 and guidance of the upper section of the rear cargo wall 23, the solutions provided for these problems in accordance with the invention being explained in detail below.

As can also be seen in detail from the view shown in FIG. 13, a sectional rail 31 is set into each side wall 15 and has (cp. FIGS. 3 and 4) a box-type section 32 with a guide slot 33, which can be held from behind by the bolt head 34 of a retaining bolt 35. Such a sectional rail 31, the design and manner of function of which is described below in more detail, is customary in the side areas of aircraft cargo compartments, in order to permit the attachment of so-called lockers at the required points, such lockers being used to lash piece goods securely where necessary. The sectional rail 31 is thus a facility for anchoring, and has a high load-bearing capacity.

The arrangement of the guide section 13 between the side walls 15 of the cargo compartment 3 can be seen in FIG. 1, the conveying surface 18 not being shown in the vicinity of the guide section 13. As can be schematically seen from the illustration in FIG. 1 with regard to distribution of the belts 10, the belts 10 are arranged essentially symmetrically to the longitudinal mid-plane 49 of the conveying device 9, but are situated displaced as far as possible to the outside with reference to the longitudinal mid-plane 49. At a given tensile force in the belts 10, the bending moment transferred to the guide section 13 is thus minimized by means of minimization of the lever action. However, an extremely strong mounting for the guide section 13 on the side walls 15 is necessary, in order to permit trouble-free absorption of the high tensile forces and bending moments occurring.

As can also be seen in FIGS. 2 to 5, the guide section 13 features a retaining rail 50 on both sides, this retaining rail bearing retaining sections 51 at a large distance from each other, such retaining sections being used for fixing to the sectional rail 31. The retaining section 51 are situated at such a large distance from one another because with a correspondingly large spacing of, for instance, more than 20 inches, it is no longer necessary to assume mutual interaction between the retaining sections 51, and each retaining section 51 is then capable of transferring the full permissible force into the sectional rail 31.

As can be seen in detail in FIG. 2, each retaining section 51 features a number of recesses 52, 53 and 54, in the present example three. While the centre recess 53 is of circular configuration, the outer recesses 52 and 54 each have their own external recesses 55 and 56. As can be seen in FIGS. 3 and 4, the recesses 52, 53 and 54 are in alignment with corresponding recesses 41 and/or entry zones 42 of the sectional rail 31, with the result that the bolt heads 34 of the retaining bolts 35 can pass through both recesses 52 and 54 and recesses 41 and/or entry zones 42 of the guide slot 33 of the sectional rail 31 when the retaining section 51 is placed in position on the sectional rail 31. From this starting position, the retaining bolts 35 can be moved outwards to the side, with the result that the bolt heads 34 enter the adjacent retaining zone 43 of the sectional rail 31, whith the bolt shanks 39 entering the vicinity of the recesses 55 and/or 56, in which they can be accomodated, where necessary with tolerance play.

In this position, a retaining plate 57 is placed in position over the retaining section 51, such retaining plate featuring holes 58 for the bolt shanks 39 located at such a distance from one another that the bolt shanks 39 are secured when they pass through the holes 58 at a spacing equating to the spacing of the recesses 55 and 56, and thus the retaining bolts 35 can no longer return to the area of the entry zones 42 of the guide slot 33. The retaining plate 57 also features a central pin 59, which enters the opening 53 of the retaining section 51 and the entry zone 42 of the guide slot 33 of the sectional rail 31, located behind the retaining section 51, essentially without tolerance clearance, when the retaining plate 57 is fixed with the retaining section 51 to the retaining bolt 35 by means of the retaining nuts 60. An extension 45 of suitable dimension on the bolt head 34 is used to achieve appropriate contact with the inner side of the box-type section 32 to secure against rotation, in order that the bolt head 34 cannot rotate when the retaining nut 44 is screwed into position. In this way, the essentially nonplay seating of the pin 59 in the recess 53 and the entry zone 42 assures positioning of the retaining plate 57, and, in particular, of the retaining section 51 in the longitudinal plane of the sectional rail 31, while the retaining nuts 60 produce retaining force on the sectional rail 31. In this way, the two retaining sections 51 located at a large distance from one another are fixed securely to the sectional rail 31 on each side of the guide section 13, and the guide section 13 is thus supported against the tensional forces arising from the belts 10.

As shown in FIG. 1, a ramp 61 with the lateral retaining sections 62 is fixed on the sectional rail 31 in front of the guide section 13 viewed in the direction of loading as shown using the arrow 19. As can be seen from FIGS. 14 and 15, the ramp 61 serves to form an approach incline 63 to the upper side of the guide section 13, to protect the area of the reversing edge 16 of the guide section 13 against damage and to make it possible to push goods to be transported onto the conveying device 9 in the vicinity of the loading aperture 5.

As can be seen from FIGS. 8 and 9, a sealing device 64 or, alternatively, a sealing device 65 is attached to the ramp 61, and serves to prevent the ingress of dirt and foreign bodies into the area below the guide section 13.

Figure 8:
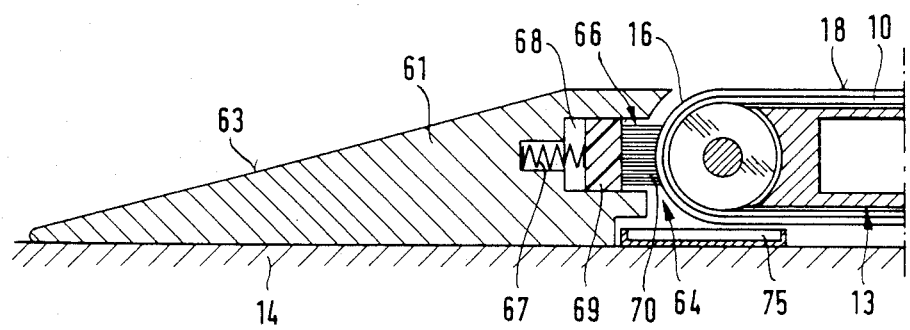
FIG. 8 is a sectional view taken along Line VIII—VIII in FIG. 1, enlarged.
Figure 9:
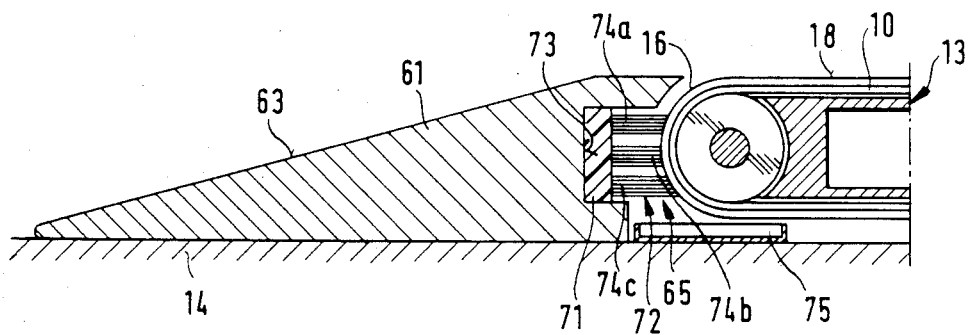
FIG. 9 is a sectional view of a modified embodiument of the invention, shown in FIG. 8.

In the example shown in FIG. 8, the sealing device 64 takes the form of a brush arrangement 66 featuring a support section 69 arranged with springs 67 in a recess 68 in the ramp; this support section presses the bristles 70 against the conveying surface 18 under reversal at the reversing edge 16. In the case of the variant shown in FIG. 9, three rows of bristles 74a, 74b and 74c are supporting on a support section 71 of the bristle arrangement 72 in a recess 73 of the ramp 61, such rows of bristles possibly possessing differing rigidities, and thus being selectively effective against dirt and foreign bodies. A dirt collection pan 75 is installed on the underside of the arrangements of the bristles 66 and/or 72 and collects the fine dirt which penetrates through the bristle arrangements 66 and/or 72 and permits easy removal of such dirt.

Figure 7:
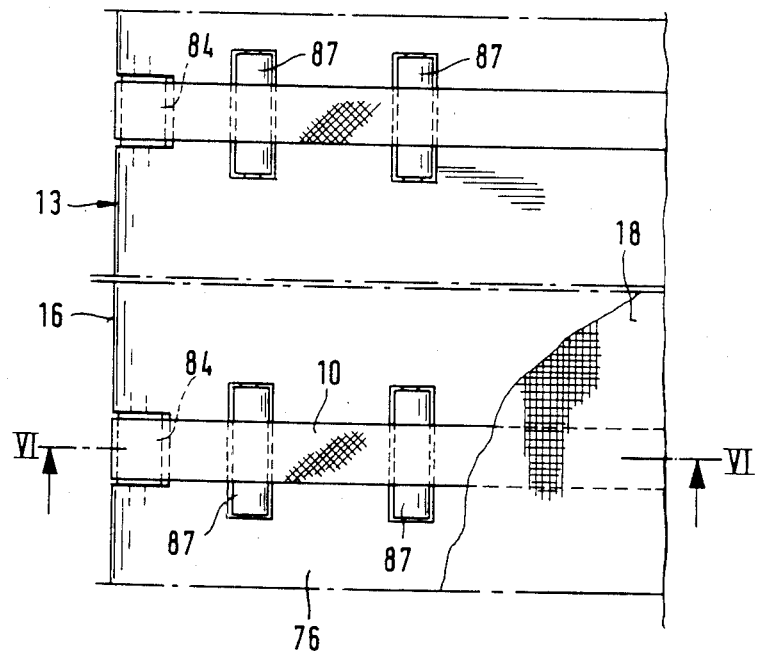
FIG. 7 is a plan view and is taken from the direction of Arrow VII in FIG. 6, with portions of the conveying surface removed for easier comprehension.

An advantageous variant of the guide section 13 area is shown in more detail in FIGS. 6 and 7. Here, the guide section 13 has a main section 76.

Since the guide section 13 is freely suspended between the lateral retaining rails 50 and leaves a design gap 83 to the floor 14 of the cargo compartment 3 for passage of the belts 10 and the conveying surface 18, deflections of the main section 76 of the guide section 13 must be anticipated due to the high tensile forces on the belts 10. Particularly at the commencement of the unloading sequence, the belts 10 draw downwards around the reversing edge 16 with the result that the gap 83 may be closed and the belts 10 complete with the conveying surface 18 could be trapped between the floor 14 and the underside of the main section 76, particularly in the vicinity of its reversing edge 16, resulting in serious blockage of conveying motion.

In order to counter this possibility, reversing rollers 84 are provided in the vicinity of the belts 10 at the reversing edge 16 and align with or project only slightly above the contour of the reversing edge 16. The revesing rollers 84, which are restricted to the area of the belts 10, reduce friction in the belts 10 during reversal around the reversing edge 16 and thus reduce the overturning moments or pitch moments acting on the guide section.

Further assurance against such trapping is provided by the fact that the support rollers 85 are arranged on the underside of the main section 76 of the guide section 13 in the vicinity of the belts 10 and project slightly above the underside of the main section 76. If the main section 76 of the guide section 13 should drop towards the floor 14 of the cargo compartment 3, support is thus provided by the support rollers 85 and the mobility of the belts 10 thus maintained. Friction with the floor can further be minimized by the fact that support rollers 86 are arranged in the floor 14 opposed to the support rollers 85; in a case such as that supposed, the support rollers 85 would be supported on the support rollers 86 via the belts 10 and/or the conveying surface 18, with rolling friction occurring therefore on both sides. Taking into account the particularly critical conditions prevailing at the commencement of the unloading phase, a front support roller 85 and/or 86 or a pair of rollers 85/86 should be installed as near as possible to the reversing edge 16, in order to keep any deflection off the section of the main section of the guide section located in front of the support rollers 85 and/or 86, caused by the forces occurring within the required limits.

Facilitation of the movement of the belts 10 on the upper side of the main section 76 of the guide section 13 can also be achieved by means of support rollers 87, which are arranged in the area of the belts on the upper side of the guide section 13 and permit rolling friction at this point. This would further facilitate transportation of heavy goods in particular.

Figure 19:
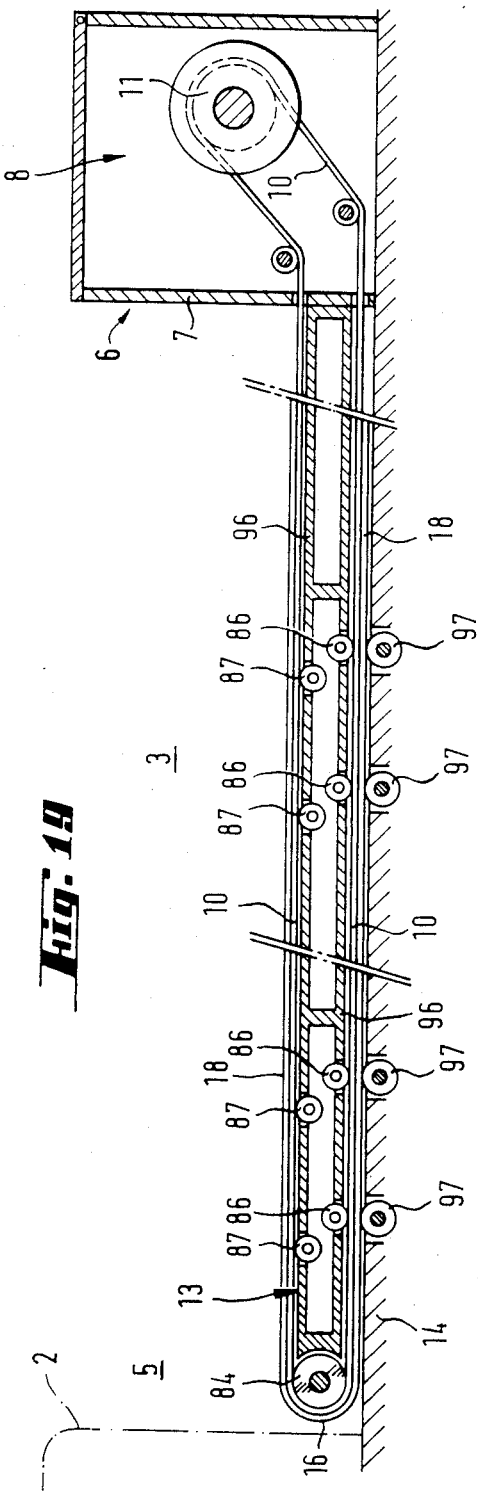
FIG. 19 is a longitudinal sectional view in accordance with Line VI—VI in FIG. 7 through a variation of the invention.

As can be seen from FIG. 1, the belts 10 and/or the conveying surface 18 with the loads situated on them would come into contact with each other after commencement of the loading sequence, after which the rear end passes gradually further forwards into the vicinity of the guide section 13 and mutual stressing would cease again. Across the zone of possible mutual contact of the belts 10 and the conveying surface 18 with the goods located on them, which zone extends approximately halfway across the effective depth of the cargo compartment 3, increased wear may occur due to friction, in particular at seams. In order to prevent this, a slide plate 96 is provided at the connection point to the rear edge 17 of the guide section 13, as can be seen in FIG. 19; this slide plate prevents intercontacting of the belts 10 and the conveying surface 18 in this area. The slide plate 96, which could be made of sheet or plate metal, but which should, taking into account the requirement for weight-saving in aviation, preferably be made of plastic, will produce a low-wear sliding friction for the belts 10 and the conveying surface 18. Particularly good sliding characteristics will be obtained if the slide plate 96 has a surface in Teflon or another non-friction plastic, or is, possibly, made completely in Teflon. It should be pointed out that the conveying surface 18 and the belts 10 are shown in the illustration in FIG. 19, and in particular, in the detail shown here, as rigid elements, in order to facilitate an easily comprehensible illustration, but that the conveying surface 18 in the area between the belts 10 naturally contacts in practice, due to the pressure exerted by the load, with the slide plate 96, and is pushed away by the slide plate 96 from the belts 10 situated below this in this area in the present example.

Naturally, the slide plate 96 could also be supported across a greater length than half the effective depth of the cargo compartment 3. As can in this context be seen in FIG. 19, the slide plate 96 can take the form of a component of the guide section 13 and could then make an additional direct contribution to support of the reversing edge 16 of the guide section 13, for instance, against the housing 7 of the drive 8. If such support of the guide section 13 with a shorter slide plate 96 is desired, a lateral pressure-resistant anchoring of the slide plate 96 to the sectional rails 31 can be provided, as was already detailed in principle above for the guide section 13. This would produce additional reinforcement of the guide section 13, and, if necessary, separation of the belts 10, running above and below with the conveying surface 18, across the entire length of the cargo compartment 3. Where necessary, support rollers 97 can be provided in the vicinity of the belts on the upper side and/or underside of the slide plate 96 and/or — in a similar manner to that explained in conjunction with FIGS. 6 and 7 — at an appropriate point in the floor 14 of the cargo compartment 3; such support rollers would further improve non-friction characteristics. An essential point in this context is the fact that all support rollers 85, 86, 87, 88 and 97 may only be located in the vicinity of the belts 10, since, due to the concentration of forces in the belts 10 alone, corresponding support is of particular significance only at this point.

The lateral anchoring of slide plate 96 can also be used to suspend the slide plate in a similar manner to the guide section 13, in order that it is freely suspended without load, and preferably also at maximum rated load, but without additional centrifugal forces, between the lateral fixing areas and permits unobstructed passage of the belts 10 and the conveying surface 18 on its underside.

Figure 20:
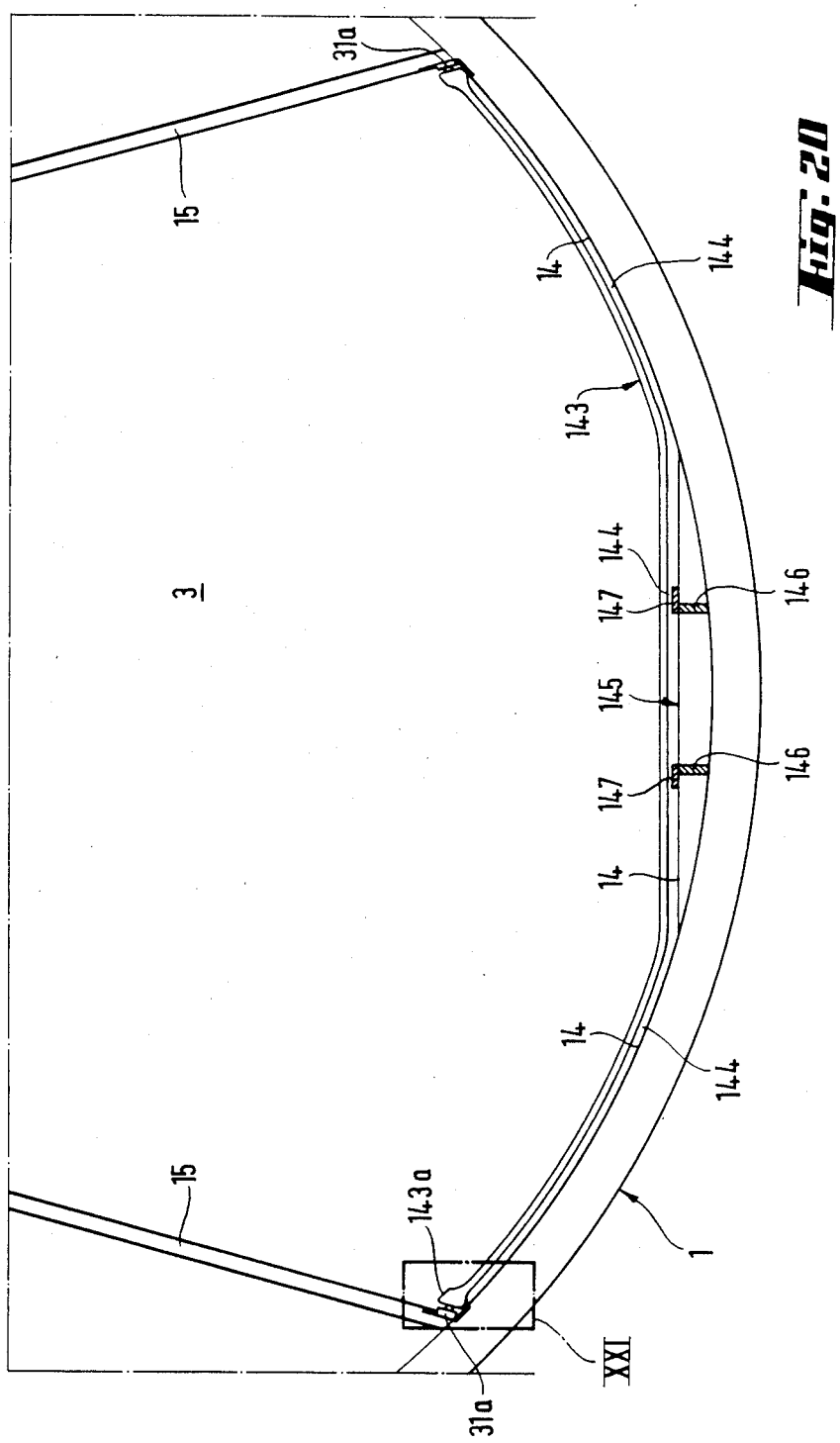
FIG. 20 is a view, largely identical to the lower section in FIG. 13, of a further variation of the invention.

Such a concept can be seen in FIG. 20, which shows in diagrammatically simplified form a section through a central area of the cargo compartment 3 in front of the rear cargo wall 23 but behind the guide section 13. The floor 14 of the aircraft fuselage 1 is bridged by a slide plate 143, which is suspended on the lateral guide rails 31a and leaves a gap 144 between itself and the floor 14 across the entire width. The slide plate 143 thus provides the floor-side boundary of the cargo compartment 3 across its entire length and is covered on its upper and lower side by the conveying surface 18 and/or the belts 10 in a manner not described in more detail in FIG. 20. In this way, the belts 10 and the conveying surface 18 can move freely in the gap 144, without such movement being obstructed by mutual contact, trapping, etc. For this purpose, the slide plate 143 must be capable of absorbing corresponding tensile forces, which can be achieved with low weight and low structural height by the use of a suitable lightweight composite structure, for instance a sandwich structure or, in particular, honeycomb structure, as is described in more detail below. The arrangement should, preferably, be made such that under maximum rated load applied, elongation of the slide plate 143 is in the worst possible case such that the gap 144 is completely closed at no point, in order that a free gap 144 is always available during loading and unloading operations.

However, flight situations can occur in which considerable centrifugal forces act in the direction of the floor 14 and multiply the weight of the piece goods located on the slide plate 143. In order to prevent damage to the slide plate 143 under such deformations, the gap 144 is designed in such a way, particularly in the mid section of the cargo compartment 3 that, under excessive loading, for instance 1.5 times maximum rated load, deformation of the slide plate 143 is restricted by floor supports, for instance, from the floor 14 itself.

As compared to the arrangement for a non-load-bearing slide plate, such a load-bearing slide plate 143 will, of course, cause additional weight. In order to compensate for this, a section of the surface structure, the planking of the normal floor 14 in the cargo compartment 3 can be removed, with the floor support structure 145 shown only diagrammatically remaining, and could in the present example feature two supports 146 standing upright at both sides of the longitudinal centerline of the aircraft. Instead of the planking in this flat section of the floor 14, only two support rails 147 laterally braced are provided, being supported on their underside on supports 146 and serving themselves as a support for the slide plate 143 in case of excessive deformation. In this way, the deformability of the slide plate 143 in unusual flight situations can be restricted.

Figure 21:
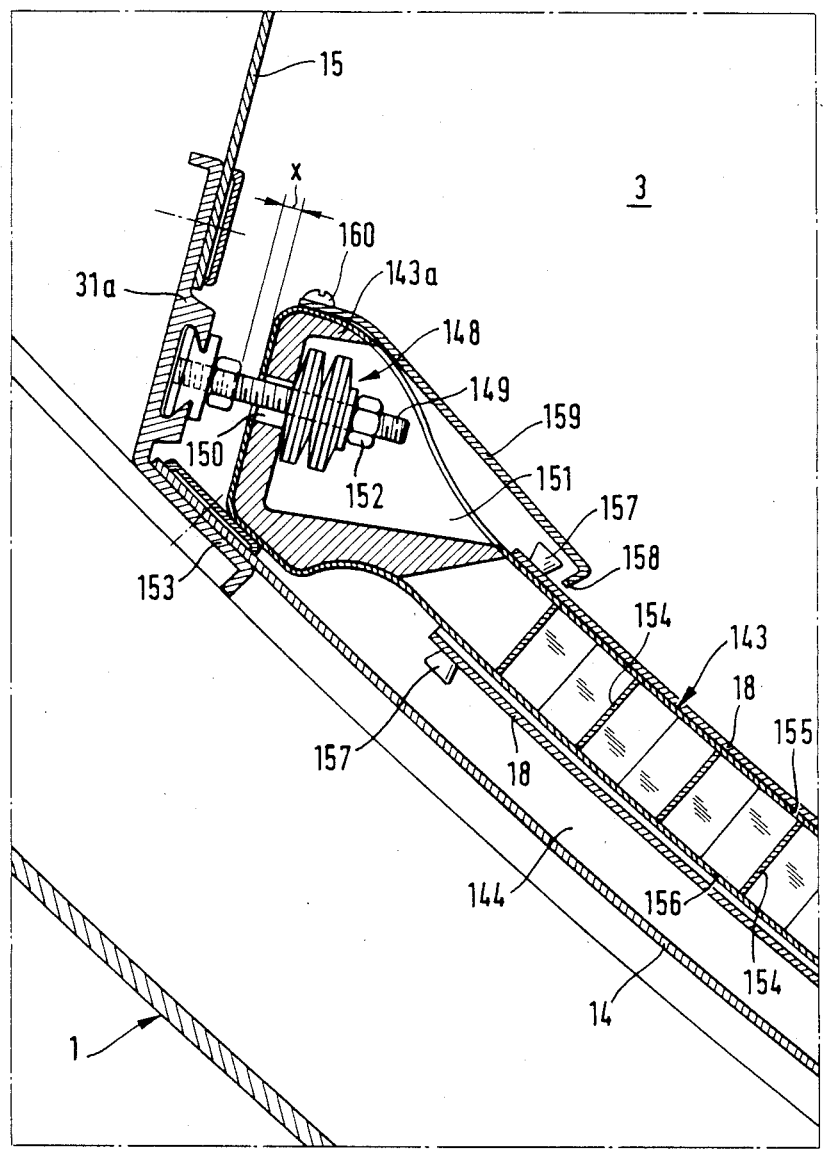
FIG. 21 is a detailed view from the Circle XXI in FIG. 20, enlarged.

In order, despite the attainment of an adequate height for the gap 144, to minimize material deformation of the slide plate 143, this slide plate is laterally supported on correspondingly hard springs 148, as is illustrated in FIG. 21. For this purpose, a retaining mechanism as, for instance, already described in more detail in conjunction with FIGS. 2 to 5, is arranged in the sectional rail 31a, and bears retaining bolts 149 which have external threads. The slide plate 143 has a thicker section 149 on its side edges, which section bears the holes 150 for the retaining bolts 149 and the local recesses 151 for the fitting of a lock nut 152 and the springs 148, which take the form in the present example of a group of cup springs. Vertical support of the edges of the slide plate 143 is achieved in the vicinity of the thicker section 149 on a support rail 153 on the sectional rail 31a. FIG. 21 shows the fully loaded condition of the slide plate 143, with the springs 148 completely compressed and the thicker section 149 having moved by a distance x from its most extreme opposed support point, onto which it is pressed by means of the lock bolt 152 in its initial position at a defined force via the springs 148. In this way, a spring travel path x is available on both sides, in order to permit deflection of the slide plate 143 under extraordinary loadings, and thus to prevent deformation of its material. As is indicated in FIG. 21, the slide plate 143 consists in the present example of vertical honeycomb walls 154, which, for instance, form a system of adjacent hexagons and are closed on both sides by cover plates 155 and 156 on which the conveying surface 18 runs.

As can also be seen in FIG. 21, easy lateral securement of the position of the edges of the conveying surface 18 can be achieved. For this purpose, the lateral edges of the conveying surface 18 feature retaining elements 157 in the form of, for example, rivetted-on projecting plastic knobs, which in non-loaded condition of the conveying surface 18 are supported in their lateral position by their material rigidity. However, as soon as any forces start to act, for instance due to the piece goods, such forces causing the retaining elements 157 to pull in the direction of the center line of the aircraft, these knobs engage in a restraining edge 158 of a retaining rail 159 and their further inward motion is thus prevented. In this manner, there results in normal operation no frictional obstruction due to retainment of the lateral edges of the conveying surface 18, but a neat lateral positional retainment under contractional forces acting from the piece goods, since these then press the retaining elements 157 into contact with the restraining edge of the retaining rail 159 projecting over the retaining elements 157.

It will in general suffice to provide the retaining rail 159 on the upper side of the slide plate 143, whereby it can be supported on the thicker section 149, bolted at 160, for instance, and is then only fixed indirectly against the sectional rail 31a. On the underside, the material rigidity of the conveying surface 18 will suffice for positioning of the lateral edges, whereby the retaining elements 157 running on the underside in the gap 154 assume a position in the immediate vicinity of the thicker section 149 and are thus protected against trapping forces when the slide plate 143 deforms. Of course, such a mechanical retaining mechanism for the lateral edges of the conveying surface 18 can also be used where necessary for the other variants illustrated, for instance to reduce friction in the weatherstrip retaining rails 36.

A first variant for the arrangement and support of the cargo wall 23 is shown in more detail in FIGS. 10 to 12. As already explained, this arrangement features not only the vertical rear cargo wall 23 but also a floor wall 24 fixed to the rear wall and lateral web-type extensions 25 between which and the floor wall 24 a slot 26 for passage of the conveying surface is provided.

A further guidance system for the rear cargo wall 23 in its vertical position results from the pair of support rollers 27 and 28 arranged on the extension elements 25 at a distance from one another; these rollers engage in running slots 98 and 99 on the running rail 29 and ensure that the rear cargo wall 23 is kept in an upright position. The rollers 27 and 28 are mounted in such a way that they can be rotated around axle bolts, which are fixed to a bracket on the outer side of the extension elements 25 in such a way that the support rollers 27 and 28 act on the running rail 29 from the upper and under side.

As can be seen in detail in FIGS. 10 to 12, the belts 10 pass under the floor wall 24 of the arrangement for the rear cargo wall 23, but are linked to the floor wall 24 via front and rear tension loops 103. Alternatively, the belts 10, too, can, of course, enter the tension loops 103, so that the floor wall 24 is included in the tension connection of the belts 10. However, this would necessitate corresponding complexity and expenditure on the fixing of the belts 10 to the floor wall 24 for the transmission of major tensile forces, and it would furthermore be necessary to ensure that no stretching occurs in the area of these fixings, since such stretching would partially negate the non-elastic characteristics of the belts. The belts 10 consist of aramide fibres, for instance Kevlar material, produced by Du Pont, and are distinguished by extremely low stretching, which could be partially negated by connecting elements if particular preventive care is not taken.

The result of the arrangement selected is that the rear cargo wall 23 does not influence the behaviour of the belts 10 in any way whatsoever, but is merely carried along by the belts 10, with lesser forces occurring in the vicinity of the tension loops 103 than would be the case if the wall was included in the tensile system. As can be seen particularly in FIGS. 11 and 12, tension loops 103 are connected to the belts 10 by means of seams 104 and are closed by seams 105 to form the loops. The loop runs over a retaining web 106, which can, for instance, be connected to the floor wall 24 by mens of lateral bolts 107. While only the belts 10 are present on the side of the rear cargo wall 23 facing away from the loading aperture 5, the textile material of the conveying surface 18 situated in front of the rear cargo wall 23 towards the loading aperture 5 is drawn over the tensioning loops 103 and the floor wall 24 and fixed, in the case of 108 (please see FIG. 10), in a similar manner to the floor wall 24 in the vicinity of the rear cargo wall 23.

There thus results a largely uniform and unhindered cargo area in the direction of loading up to the rear cargo wall 23.

For the variants shown in FIG. 10, it is assumed that the rear cargo wall 23 itself takes the form of a self-supporting structure, for instance as a solid sheet structure or, alternatively, a skeletal structure, which would result in a certain increase in the weight of the conveying device 9, which is undesirable in an aircraft. This increasing weight can be reduced by a variant of a rear cargo wall 23a as shown in FIGS. 13 to 15. Here, the floor wall 24 is fitted on both sides with flexible couplings 109, which are attached to the extension elements 25a. The extension elements 25a, as is apparent in FIG. 15 in particular, are of web type only up to the height of the running rail 29 with the support rollers 27 and 28, in order to permit the required support with a space towards the rear of the cargo compartment 3, and take the form only of retaining rods 110 above this support level. The rear cargo wall 23a takes the form of a textile covering 111, which is stretched between the floor wall 24 and the extension elements 25a and/or the retaining rods 110. The textile covering 111 could, for instance, consist of the same nylon fabric as used for the conveying surface 18. In order to obtain a high degree of resistance to deflection and taut tensioning, the textile covering 111 is reinforced by tapes 112, which run between the extension elements 25a and in particular form the edge of the upper end of the textile covering 111, which could be particularly easily deflected when goods for transport are in contact with it.

As can be seen in FIG. 14 in particular, the retaining rods 110 are laterally braced against the side walls 15 of the cargo compartment 3, in order to place the tapes 112 running between them under a required tension. For this purpose, a further running rail 29a is installed in the upper section of the side walls 15 of the cargo compartment 3; if necessary, this rail can also be supported on the sectional rail 31 at this point in a manner not shown in more detail; such sectional rails 31 are generally also installed in this section of the cargo compartment 3. Tensioning rollers 115 and 116 engage in running slots 113 and 114 of the running rail 29a, but run, in contrast to the support rollers 27 and 28, with an aligned axis on the surface of the running slots 113 and 114 parallel to the side wall 15 and facing away from the side wall 15, and are themselves supported by a running bogie 117. The shanks of clamping bolts 119 engage in a floor plate 118 of the running bogie 117; these bolts pass through the retaining rod 110. This arrangement produces a tensioning mechanism designated as a whole as 120, by means of which a required force can be applied to the tape 112 fixed in the adjacent retaining rod 110 by means of corresponding screwing in of the clamping bolts 119 into the floor plate 118 of the running bogie 117.

As can be seen in FIG. 15, a corresponding running bogie 117 is additionally provided on the guide rail 29, in order to correspondingly tension the lower tape 112 in the drawing, but this would not be necessary in all cases, since bracing on the upper running rail 29a introduces tensioning forces with a favourable leverage around the joints 109.

Instead of a trough-type floor wall 24, which would produce extra weight and would need to be secured by means of the running rail 29 with the rollers 27 and 28 against, for instance, the tilting force exerted on the rear cargo wall 23 or 23a by piece goods, an essentially only two-dimensional design of the rear cargo wall 23 or 23a can also be selected, in which the further construction in conjunction with the floor wall 24 in front of the retaining rod 110 shown in FIG. 15 can be omitted. This would also produce the advantage that the rear cargo wall 23 and/or 23a will not require precise parallel guidance, but will, according to the loadings or tensile forces arising from the belts 10, also be able to assume a position inclined with respect to the lateral plane of the aircraft, without tilting. Backwards tipping of the rear cargo wall 23 or 23a under the weight of piece goods exerting a force against it can in this case be prevented by the provision on the rear of the rear cargo wall 23 and/or 23a opposite to the floor wall 24 of floor support wheels attached via appropriate extensions not shown in more detail and producing a lever force. Such a structure would, in particular, be suitable in conjunction with a continuous slide plate as detailed in FIGS. 19 to 21, since the support wheels at the rear of the rear cargo wall 23 and/or 23a would then contact directly with the upper side of the slide plate 96 and/or 143 in the area between the belts 10 and could there support the rear cargo wall 23 and/or 23a against tipping. The opposing force providing a righting moment directed against tipping motion resulting is the tensile force of the belts 10, which in case of tipping moment occurring due to piece goods located is substantially supported by the very weight of these piece goods. Slight tipping motions within the range of tolerance of the rollers 115 and 116 on the guide rails 29 and 29a are not of significance.

FIG. 16 illustrates a possibility for drive of conveying device 9 via the rollers 11 situated opposite the loading aperture 5 for each belt 10.

The variant shown in FIG. 16 features a horizontal shaft 121 and laterally connected inclined shafts 122, which are arranged in the housing 7 supported on pedestals 123 on the floor 14 of the cargo compartment 4. Universal bearings 124 are installed between the shafts 121 and 122 and serve to connect the shafts in order to obtain an enforced synchronous mode of rotation. Drive of all the shafts 121 and 122 is achieved via an electric motor not dealt with in more detail and a gearbox which drives the shafts 121 and/or 122 driving the rollers 11. Pressure springs 125 are arranged on the housing 7 above the rollers 11 and retain the belts 10 securely on the means for rotationally entraining the rollers 11.

As can be seen from FIG. 16, the belts 10 are guided to a small vertical distance from one another by the rollers 11, with the result that they can, as shown in FIG. 1, enter the cargo space of the cargo compartment 3, directly via corresponding apertures in the front panel of the housing 7.

An arrangement of rollers 11 for rolling up and off the belt 10 each on different parallel shafts 121 and/or 122 provides a possibility to drive the rollers 11 for the front ends and the rollers 11 for the rear ends of the belts 10 separately if necessary, in order to additionally feed belt material into the cargo area of the cargo compartment 3 and reduce tension in this area. This will make it possible to raise the conveying surface 18 complete with belts 10, naturally with cargo compartments 3 empty, a considerable distance and provide quick and easy access for inspection purposes to the areas situated below. During operation, it will nonetheless be possible to ensure enforced synchronous running.

Figure 18:
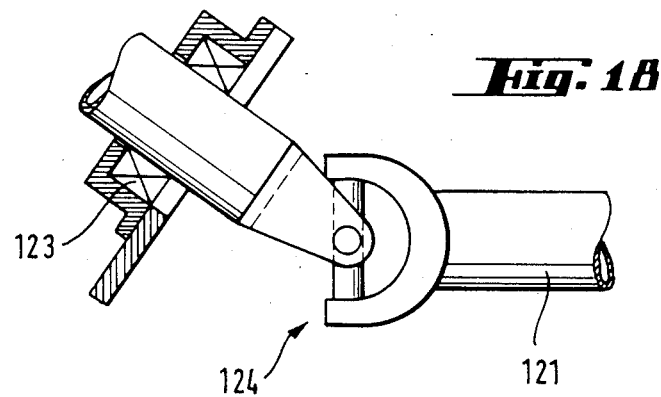
FIG. 18 is a detailed view from the Circle XVIII in FIG. 16, enlarged.

As can be seen in FIG. 18, the rollers 11 on the shafts 121 and/or 122 are designed in such a way that the journal of the shaft 121 and/or 122 itself serves as the winding core or roller body, and formation of windings and/or guidance of the belt 10 is assured by means of lateral webs 129 on the shaft 121 and/or 122. Also discernable are the support for the shaft 122 on one of the pedestals 123 and the connection to the shaft 121 via the universal joint 124.

FIG. 17 shows on a larger scale a detail of the variant described in FIG. 16. As can be seen here, the housing 7 features a cover 130 which can be opened around a hinge 132; pressure springs 125 for pressurizing the outermost winding of the windings 133 on the rollers 11 are fixed to the inside of this cover. The pressure springs 125 take the form of simple leaf springs in plastic which are pressed flatter and flatter by the increasing diameter of the windings 133. When the housing cover 130 is opened, the top of the windings 133 is thus freely accessible.

Instead of the strap-type pressure springs 125, a type of hold-down element not shown in more detail in the form of a block with a rounded contact surface which is pressed on to the outermost winding of the belt can be used. In the present case where an endless belt 10, for instance, in the form of a toothed belt or similar is reversed on a sprocket, such a pressure block can be used in the case of rigid sprung or non-elastic support to avoid any danger of the belt 10 in the form of a toothed belt or similar, jumping out of its positive-locking engagement.

The belts 10 leave the housing 7 via slots 131 at a definite height. The belts 10 are routed via the hold down clamps 126 already mentioned in the form of guide rollers, which ensure the correct attitude of the belts 10 to their respective slot 131.

With endless configuration of the belts 10 and their reversal via a single roller 11 per belt 10, which will not wind on any belt 10, it must only be ensured that drive forces can be applied from the rollers 11 to the respective belt 10 with as little slippage as possible. In addition to a friction-enhancing surface for the roller 11, which will then, of course, rotate with the shaft 127, such surface being possibly of rubber or a similar material, the belts 10 can be provided in a manner not described in more detail with a positive-locking configuration, for instance as toothed belts or belts with drive recesses into which drive elements of the rollers 11 engage. If necessary, a tensioning mechanism to maintain a minimum tension in the respective belt 10 can be installed in the section of the belts 10 between the rollers 11 and the hold-down clamps 126, while actual drive can be achieved as described in conjunction with FIG. 16. The special design of the belts 10 as toothed belts, perforated belts or similar, suitable for positive-locking drive, can be provided across the entire length in order to form a genuinely complete tensile element, but is in functional terms only necessary in that section of the belts 10 which actually comes into contact with the rollers 11 during backwards and forwards movement. In the area of the conveying surface 18, another, possibly flatter configuration for the belts 10 than that in the actual drive area can therefore be selected if required. Such a multisection configuration for a continuous rotating belt 10 should also be regarded functionally as an endless belt. As in all the variants described up to now, the drive is designed in such a way that it is locked with the drive motor in standstill condition, in order that the rear cargo wall 23 is secured against movement in its respective position either by drives located at this point or via the belts 10.

The guide section 13 is with its extending slide plate 96 the only rigid component which is located above the floor 14 of the cargo compartment 3 in the vicinity of the loading aperture 5. Since the guide section 13 permits passage of the belts 10 and the conveying surface 18 between its underside and the floor 14 of the cargo compartment 3 via the gap 83, it deflects slightly under a load located on the guide section 13, reducing the gap 83, particularly if the support rollers 85 and 86 are not installed or are located at such a distance apart as permits such motion. For this reason, the tension condition in the guide section 13 between the retaining rails 50 is an indicator for the load located on the conveying device 9 in standstill condition, with the result that the guide section 13 can to some extent serve as an automatic scale for the load applied. For this reason, at least one strain gauge can be installed on an area subject to tensile loading under loading of the upper side of the guide section 13. Naturally, it is appropriate to install the strain gauge in such a way that it is not exposed to load concentrations from cargo, or to other detrimental forces; for instance, it should be set into an external surface or installed in the internal surface of the guide section 13. Alternatively, a number of strain measuring elements can be installed in the form of strain gauges and an indicator of weight determined using a suitable evaluation system. In case of excess weight, a simple electronic system can be used to actuate an indicator lamp or to disable the conveying device 9. It would in this way be possible to prevent with certainty any overloading of the floor 14, and appropriate multiple arrangements and individual evaluation systems for sensors would also make possible detection of local overloads if necessary.

At least in those sections which are not required for fixing of the ramp 61, the guide section 13, the slide plate 96 or the running rail 29, the sectional rails 31 can fulfil their basic purpose, namely the securing of cargo. It need not be stated that in such a special case in which the cargo may not be moved up using the conveying device 18 after it has been secured, it must be ensured that the drive for the conveying device 9 cannot be started with the lashings in place.

As the above description indicates, many derivations and variants of the invention are possible, without departing from the basic conceptual scope of the invention. The most essential fact is in any case that the conveying device 9 covers the floor 14 of the cargo compartment 3 flatly and does not involve any substantial sacrifice of cargo volume, due to its low height. It is also important that the conveying device 9 can, if required, be moved step-by-step, and thus perform its conveying function in accordance with the circumstances prevailing in any individual case. Also of particular importance is the fact that, due to the concentration of all tensile forces in the individual belts 10 arranged at intervals from one another, even an arched floor 14 of the cargo compartment 3 can be covered with not difficulty at all by means of corresponding arrangement of the shafts 121 and/or 122 on the one hand and corresponding non-flat configuration of the guide section 13 on the other hand, since the conveying device 9 can be adapted without difficulty to any floor contour. Utilization of the sectional rails 31 regularly provided in aircraft cargo compartments for lashing of cargo, which rails are capable of absorbing high forces, for support if necessary of all components of the conveying device 9 in the cargo area of the cargo compartment 3, will make it possible to dispense with additional fixing systems, which are particularly problematic in the field of aviation.

I claim:

1. Arrangement for loading a cargo compartment (3) of an aircraft having a curved fuselage floor with piece goods, with at least one conveying device (9), able to be moved by a motor from a loading aperture (5) of an aircraft cargo compartment (3) outwardly in a direction toward its opposite end (6) and back, which device covers the curved surface of the aircraft fuselage floor (14) of the cargo compartment (3), and by means of which piece goods placed on the conveying device (9) in the region of the loading aperture (5) can be conveyed away from the loading aperture (5) into the cargo compartment (3) and back in the direction of the loading aperture (5) during unloading, which device comprises a plurality of high-tensile flexible tensioning elements (belts 10), disposed adjacently to each other, which are held at the end (6) of the cargo compartment (3) opposite the loading aperture (5), which device features in a portion at least approximately equivalent to the depth of the cargo compartment (3) a carpetlike conveying surface (18) of a flexible textile material, and which device is reversed over a plurality of rotatable reversing rolls (84) arranged in the area of the loading aperture (5), characterized in that the reversing rolls (84) are fixed to a guide profile (13) arranged between the upper and lower portions of the conveying device (9), said guide profile being curved to conform the guide profile (13) to, and the conveying surface (18) being curved to conform to, the curved surface of the aircraft fuselage floor (14) of the cargo compartment (3), the motor drive (8) for the conveying device (9) is positioned in the area of the end (6) of the conveying compartment (3) opposite the loading aperture (5), and the guide profile (13) is supported against the tensile stress of the conveying device (9) at its side opposite to the reversing rolls (84) by a slide plate (96;143) supported against the drive (8) at the opposite end.

2. Arrangement in accordance with claim 1, characterised in that the belts (10) in any case in a functional respect are formed as endless belts, which are reversed over rollers (11) at the end (6) of the cargo compartment (3) opposite the loading aperture (5).

3. Arrangement in accordance with claim 2, characterised in that the belts (10) are formed for a positive locking motive drive, for example, are provided with drive recesses or are formed as toothed belts.

4. Arrangement in accordance with claim 1, characterised in that there is disposed on the belts (10) in the region of the rear end of the conveying surface (18) as seen in the loading direction (arrow 19), a portion of the conveying device (9) forming a loading rear wall (23).

5. Arrangement in accordance with claim 4, characterised in that the rear cargo wall (23; 23a) is secured against tipping by way of lateral extension elements (25; 25a) with support elements (support rollers 27, 28) disposed at intervals from each other in the direction of motion (arrows 19, 20), which rollers run on slide rails (29) on the lateral walls (15) of the cargo compartment (3).

6. Arrangement in accordance with claim 1, characterised in that the slide plate (96; 143) following the rear edge (17) of the guide section (13) features a surface having good sliding properties, such as of slideable plastic material like tetra fluor carbon (Teflon), and extends at least over half the depth, preferably over the entire depth, of the cargo compartment (3).

7. Arrangement in accordance with claim 6, characterised in that the slide plate (96; 143) directly supports the guide profile (13) on the side opposite the reversing edge (16).

8. Arrangement according to claim 6, characterized in that said cargo compartment (3) has side walls (15) mounting sectional rails (31;31a) and the slide plate (96;143) is attached to the sectional rails (31;31a) of the aircraft on the side walls (15) of the cargo compartment (3).

9. Arrangement in accordance with claim 8, characterised in that the slide plate (143) is supported in a suspended manner above the floor support structure (145) of the cargo compartment (3) and forms the floor.

10. Arrangement in accordance with claim 9, characterised in that the lateral securement of the slide plate (143) is achieved by means of springs (148), the hardness of which should preferably be selected in such a way that contact of the slide plate (143) with the floor support structure (145) of the cargo compartment (3) does not occur under maximum rated loading on the conveying surface (18).

11. Arrangement in accordance with claim 9. characterised in that support rails (147) running longitudinally along the mid-section of the cargo compartment (3) are provided and form defined supports for the slide plate (143) in case of exceptional deflection in a downward direction of the slide plate (143).

12. Arrangement in accordance with claim 6, characterised in that the slide plate (143) takes the form of a composite lightweight structure employing rigid honeycomb or sandwich structure materials.

13. Arrangement in accordance with claim 6, characterised in that the lateral edges of the conveying surface (18) are secured against undesired lateral contraction movement by a mechanical retaining mechanism, and that the retaining mechanism is positioned on the upper side of the sliding plate (143).

14. Arrangement according to claim 13, characterised in that the retaining mechanism features a retaining rail (159) with a catch lip (158), which projects above the projecting retaining elements (157) arranged on the upper side of the conveying surface (18), preferably with a degree of play.

15. Arrangement in accordance with claim 1, characterised in that in the region of the belts (10), at least in the central section of the guide profile (13) between the lateral walls (15) of the cargo compartment (3), support rollers (85, 86, 87, 97) are provided in the floor (14) of the cargo compartment (3) and/or of a slide plate (96) adjacent thereto.

16. Arrangement in accordance with claim 15, characterised in that floor-mounted support rollers (85, 86) are provided close to the reversing edge (16) of the guide profile (13).

17. Arrangement in accordance with claim 1, characterised in that in the region of the belts (10) at the reversing edge (16) in the guide profile (13) bearing-supported reversing rollers (84) are disposed that preferably protrude at most insignificantly above the outline of the reversing edge (16).

18. Arrangement in accordance with claim 1, characterised in that on the side of the conveying surface (18) opposite the reversing edge (16) of the guide profile (13) a sealing arrangement (64; 65) is disposed in the immediate vicinity of or in contact with the conveying surface (18), with the sealing arrangement (64, 65) preferably being formed as formed as a brush arrangement (66; 72), below which a dirt collection pan (75) is suitably disposed.

19. Arrangement in accordance with claim 1 characterized by including rollers (11) for winding up the front and/or rear ends of the belts (10) are attached to adjacent shafts (121;122) disposed inclined to one another.

* * * * *

UNITED STATES PATENT AND TRADEMARK OFFICE
CERTIFICATE OF CORRECTION

PATENT NO. : 4,984,756
DATED : January 15, 1991
INVENTOR(S) : Anders Helmner It is certified that error appears in the above-identified patent and that said Letters Patent is hereby corrected as shown below:

On the Title Page "Inventor: Helmner Anders," should be --Inventor: Anders Helmner--.

In the Abstract, line 12, "fowards" should be --forwards--.

Column 1, line 62, "that" should be --than--.

Column 2, line 1, "of of" should be --of--.

Column 3, line 13, "this" should be --thus--.

Column 4, line 46, "1.4" should be --1,4--.

Column 7, line 56, "tope" should be --top--.

Column 9, line 11, "embodiument" should be --embodiment--.

Column 12, line 34, "whith" should be --with--.

Column 13, lines 51-2, "revesing" should be --reversing--.

Column 17, line 53, "mens" should be --means--.

Column 18, lines 18-19, "resitance" should be --resistance--.

Column 24, line 32, "being formed as formed as a" should be --being formed as a--.

Signed and Sealed this

Fifteenth Day of February, 1994

*Attest:*

BRUCE LEHMAN

*Attesting Officer*   *Commissioner of Patents and Trademarks*